US012573041B2

(12) United States Patent
Giassi et al.

(10) Patent No.: US 12,573,041 B2
(45) Date of Patent: Mar. 10, 2026

(54) SYSTEMS AND METHODS FOR DETECTING PARTICLE GENERATION IN GLASS-TO-GLASS CONTACT

(71) Applicant: CORNING INCORPORATED, Corning, NY (US)

(72) Inventors: Davide Giassi, Big Flats, NY (US); John Stephen Peanasky, Big Flats, NY (US); Adam James Ruggles, South Corning, NY (US); Michael David Shorkey, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 113 days.

(21) Appl. No.: 18/521,591

(22) Filed: Nov. 28, 2023

(65) Prior Publication Data

US 2024/0177312 A1     May 30, 2024

Related U.S. Application Data

(60) Provisional application No. 63/428,244, filed on Nov. 28, 2022.

(51) Int. Cl.
*G06T 7/00* (2017.01)
*G01N 15/06* (2024.01)
(Continued)

(52) U.S. Cl.
CPC ........... *G06T 7/0012* (2013.01); *G01N 15/06* (2013.01); *H04N 23/56* (2023.01); *G01N 15/075* (2024.01); *G06T 2207/30108* (2013.01)

(58) Field of Classification Search
CPC ........ G06T 7/0012; G06T 2207/30108; G01N 15/06; G01N 15/075; G01N 15/1434;
(Continued)

(56) References Cited

U.S. PATENT DOCUMENTS 3,577,256 A     5/1971  Benford, Jr.
3,607,186 A     9/1971  Bognar
(Continued)

FOREIGN PATENT DOCUMENTS

CN        114563408 A  *  5/2022
EP          3543681 A1     9/2019
WO     2019/116802 A1     6/2019

OTHER PUBLICATIONS

International Search Report and Written Opinion of the International Searching Authority; PCT/US2023/037085; dated Mar. 13, 2024; 11 pages; European Patent Office.

*Primary Examiner* — Nasim N Nirjhar
(74) *Attorney, Agent, or Firm* — Chandra J. Duncan

(57) ABSTRACT

A particle detection system and method for glass articles is provided. The system includes a light source that emits a light beam, the light beam being formed into a light sheet and being directed to an area below the glass articles; and a camera to capture an image of an inspection area within the light sheet. The inspection area may be located below the glass articles. The system can include optics to shape the light beam into the light sheet. The light source can be a laser light source. Particles falling through the light sheet in the inspection area are illuminated and an image of them is captured by the camera in a time-resolved manner.

20 Claims, 8 Drawing Sheets

(51) Int. Cl.
  *G01N 15/075* (2024.01)
  *H04N 23/56* (2023.01)
(58) Field of Classification Search
  CPC ....... G01N 15/1459; G01N 2015/0238; G01N
      2015/025; G01N 2015/0294; G01N
      2015/1029; G01N 2015/103; G01N
      15/0227; G01N 15/0211; H04N 23/56
  See application file for complete search history.

(56) References Cited

U.S. PATENT DOCUMENTS

| | | | |
|---|---|---|---|
| 4,023,953 A | 5/1977 | Megles et al. | |
| 4,055,441 A | 10/1977 | Taylor et al. | |
| 5,426,501 A | 6/1995 | Hokanson et al. | |
| 6,715,316 B2 | 4/2004 | He et al. | |
| 2006/0208172 A1* | 9/2006 | Akkerman | G01N 21/9027 |
| | | | 250/223 B |
| 2008/0291438 A1* | 11/2008 | Akkerman | B07C 5/3404 |
| | | | 356/240.1 |
| 2014/0112845 A1* | 4/2014 | Edens | G01N 35/026 |
| | | | 422/569 |
| 2016/0251260 A1 | 9/2016 | Bayne et al. | |
| 2018/0246137 A1* | 8/2018 | Heidrich | G01S 11/12 |
| 2022/0305529 A1* | 9/2022 | Durack | G01N 15/1404 |
| 2023/0029710 A1* | 2/2023 | Lai | G02B 21/26 |
| 2023/0333020 A1* | 10/2023 | Jing | G01N 15/1433 |

* cited by examiner

A

100

Glass Damage

102

104

104

SYSTEMS AND METHODS FOR DETECTING PARTICLE GENERATION IN GLASS-TO-GLASS CONTACT

CROSS-REFERENCE TO RELATED APPLICATIONS

This application claims the benefit of priority under 35 U.S.C. § 119 of U.S. Provisional Application Ser. No. 63/428,244 filed on Nov. 28, 2022, the content of which is relied upon and incorporated herein by reference in its entirety.

FIELD

The present specification generally relates to detecting particles from glass containers and, more specifically, to detecting particles generated from contact between containers and other containers or processing equipment during manufacturing, shipping, packing, or filling of containers used for storing pharmaceutical formulations.

BACKGROUND

Historically, glass has been used as the preferred material for packaging pharmaceuticals because of its hermeticity, optical clarity, and excellent chemical durability relative to other materials. Specifically, the glass used in pharmaceutical packaging must have adequate chemical durability so as to not affect the stability of the pharmaceutical formulations contained therein. Glasses having suitable chemical durability include those glass compositions within the ASTM standard 'Type IA' and 'Type IB' glass compositions which have a proven history of chemical durability.

Although Type IA and Type IB glass compositions are commonly used in pharmaceutical packages, they do suffer from several deficiencies, including a tendency for the inner surfaces of the pharmaceutical package to shed glass particulates or "de-laminate" following exposure to pharmaceutical solutions.

In addition, use of glass in pharmaceutical packaging may also be limited by the mechanical performance of the glass. Specifically, the high processing speeds utilized in the manufacture and filling of glass pharmaceutical packages may result in mechanical damage on the surface of the package, such as abrasions, as the packages come into contact with processing equipment, handling equipment, and/or other packages. This mechanical damage significantly decreases the strength of the glass pharmaceutical package resulting in an increased likelihood that cracks will develop in the glass, potentially compromising the sterility of the pharmaceutical contained in the package or causing the complete failure of the package.

In addition, contact between the packages and other packages and/or processing and handling equipment can generate scratches in the surfaces of the glass packages, which not only comprises the mechanical durability and sterility of the scratched package, but also can generate glass particles. These glass particles can then be depositing into the glass packages themselves or onto the processing lines cause hazardous conditions in the manufacturing or processing environment. The presence of these particles can also necessitate regular cleaning of facilities processing these packages, which can hinder productive by increasing downtime of processing equipment. These defects and the resulting particles can contaminate the medical product contained within pharmaceutical vials or syringes, and even be injected into a human body. Such defects can result in recalls from the Food and Drug Administration or other regulating bodies, and is a significant source of lot yield loss in the industry.

Accordingly, a need exists for systems and methods of detecting particle generation in order to confront these problems. In addition, there is also a need for a better understanding of how such particles are generated, which could be gained from improved particle monitoring systems and methods.

SUMMARY

According to embodiments, a particle detection system for glass articles is provided. The particle detection system comprises: a light source configured to emit a light beam, the light beam being formed into a light sheet and being directed to an area below the glass articles; and a camera configured to capture an image of an inspection area within the light sheet, the inspection area being below the glass articles. The system can further include an optics system configured to shape the light beam into the light sheet, the optics system being disposed in an optical path of the light beam between the light source and the inspection area. The light source may be a laser light source. In an aspect of embodiments, the system includes a holder for holding the glass articles. The holder comprises a support surface configured to support the glass articles thereon. The support surface has an open or porous structure configured to allow particles generated by the glass articles to fall through the support surface to the inspection area. The inspection area is disposed below the support surface and in a position to which particles generated by the glass articles can fall. The system can further include an actuator configured to move the glass articles. The actuator may be coupled to the holder. The particle detection system may further comprise a computing device communicatively coupled to the camera, the computing device comprising at least one processor and at least one memory storing computer readable and executable instructions that, when executed by the at least one processor, cause the computer device to determine whether a particle is present within the inspection area.

According to embodiments, a method of detecting particles generated from a glass article collision is provided. The method comprises directing a light beam to a area below one or more glass articles; capturing, by a camera, an image of an inspection area within the light beam beneath the one or more glass articles; and determining whether a particle is present in the image. The method can further include forming the light beam into a light sheet such that the inspection area is within the light sheet. The method can further include accelerating the one or more glass articles to create the glass article collision, wherein the inspection area is imaged by the camera while accelerating the one or more glass articles.

Additional features and advantages of the embodiments of the particle monitoring systems and methods described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
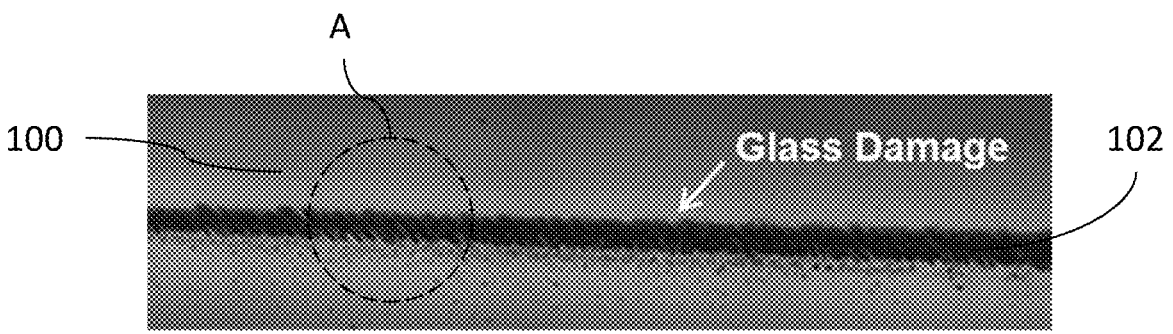
FIG. 1 is a photograph of a scratch or damage area on a glass container.
Figure 2A:
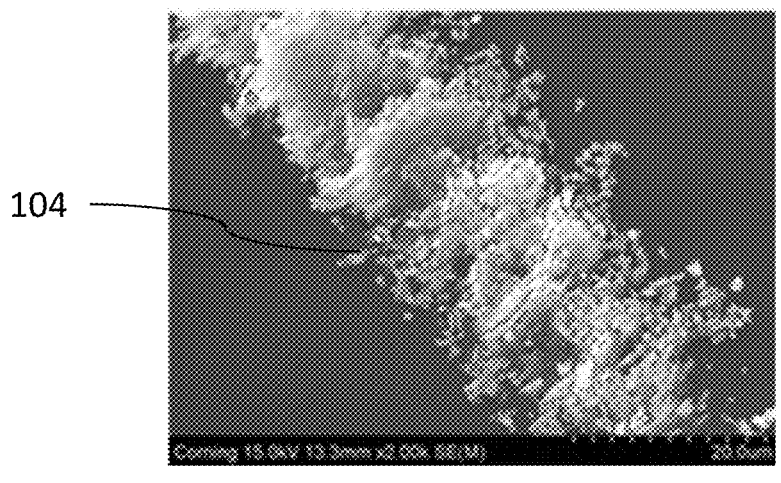
FIG. 2A is a magnified image of area A on the glass container of FIG. 1.
Figure 2B:
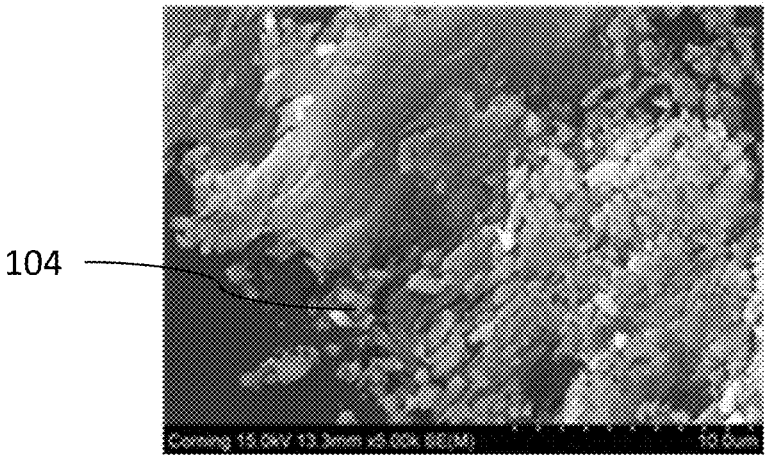
FIG. 2B is a further magnified image of area A from FIGS. 1 and 2.

Reference will now be made in detail to various embodiments of systems and methods for detecting particles generated from collisions of glass articles with other glass articles or other surfaces. Embodiments include systems and methods for detecting particles ejected from surfaces of the glass articles in a time resolved manner. The glass articles can include glass containers, particularly pharmaceutical or parenteral packaging containers (e.g., vials, syringes, tubes, etc.), but embodiments are not limited to any specific type of glass container or article. When uncoated glass articles are scratched against one another, the resultant interaction leads to glass damage and generation of glass particles. An example of such damage is shown in FIG. 1, where a glass surface 100 from an uncoated glass vial exhibits a scratch 102 after being rubbed against another glass vial with a normal force of from 1-30 N. FIG. 2A shows a magnified view of area A from the photograph in FIG. 1, and FIG. 2B shows an even more magnified view of the glass particles generated. Although the damage shown in FIGS. 1-2B are the result of an in-lab scratch test, similar results are obtained with simple glass-to-glass contact. In manufacturing and production settings, these glass particles can leave the glass articles and be deposited on other glass articles or the processing equipment in the surrounding environment (e.g., conveyors, factory floors, and other equipment). In practice, routine cleaning needs to be performed to remove the glass particles from production machinery or conveying lines. For example, in the case of pharmaceutical vials or syringes, the glass particles are typically cleaned from the production line after every vial filling campaign, and sometimes more often during the campaign.

Some glass articles are coated with coatings that reduce the coefficient of friction of the glass article surface to lessen the impact of glass-to-glass contact or contact between the glass articles and other surfaces. Valor® glass vials from Corning® are one such example of coated glass articles. The coating of Valor® vials prevents glass damage during contact and glass particles are not generated. However, in the case of coated glass articles, there could still be a concern of the coating producing particles. Therefore, systems and methods that evaluate any glass article (e.g., vial, syringe, tube, or other container), whether it is coated or uncoated, for particles would be desirable. However, such solutions have remained elusive, especially considering the complications involved in providing a practical solution in the desired settings. For example, mechanical measurements are often taken in controlled situations. This is useful for characterization of the damage, but there still exists an unmet need of being able to simulate the multiple, variable forces that vials experience while being processed on a production or filling line. Previous laboratory scale measurements of vials contacted on mock-ups of accelerator tables have shown little to no glass particles generated as a result of vial contact, and potentially no coating particles as well. However, the detection method previously used requires particles to be flung a considerable distance from the device to be detected via a particle counter wafer plate. It is likely that such a method only measures a minority of the particles generated. Additionally, this type of setup using a particle wafer plate is unable to record when the particles were captured, making the detector non-time resolved and the cumulative particle count a time integral. There are other methods in industrial powder industry that siphon a small portion of the powder distribution and characterize the size and quantity, such as the static light Scattering (SLS)/laser diffraction particle size distribution analysis by Horiba Scientific (https://www.horiba.com/gbr/scientific/technologies/static-light-scattering-sls-laser-diffraction-particle-size-distribution-analysis/static-light-scattering-sls-laser-diffraction-particle-size-distribution-analysis/). However, these methods require large quantities of particles, which may not necessarily be present in all applications. Therefore, there remains a need for a method to measure particles generated when glass articles (e.g., vials, tubes, syringes) contact one another simulating the various accelerations exhibited in a manufacturing, processing, or filling line.

Embodiments of this disclosure provide systems and methods that overcome the above shortcomings in existing methods. In particular, embodiments include systems and methods for measuring, in a time-resolved fashion, particles generated from glass articles (e.g., glass containers, vials, or pharmaceutical packaging) from article-to-article contact within the area of the contact, thereby providing a means to capture a higher percentage or a majority of the particles generated from the contact. The particles detected can be generated from article-to-article contact or can be generated from contact between an article and another surface, such as part of a manufacturing or filling line. The results of these types of particle detection measurements are application to not only manufacturing, processing, and filling lines, but also packaging and shipping processes, including inside shipping containers.

Figure 3:
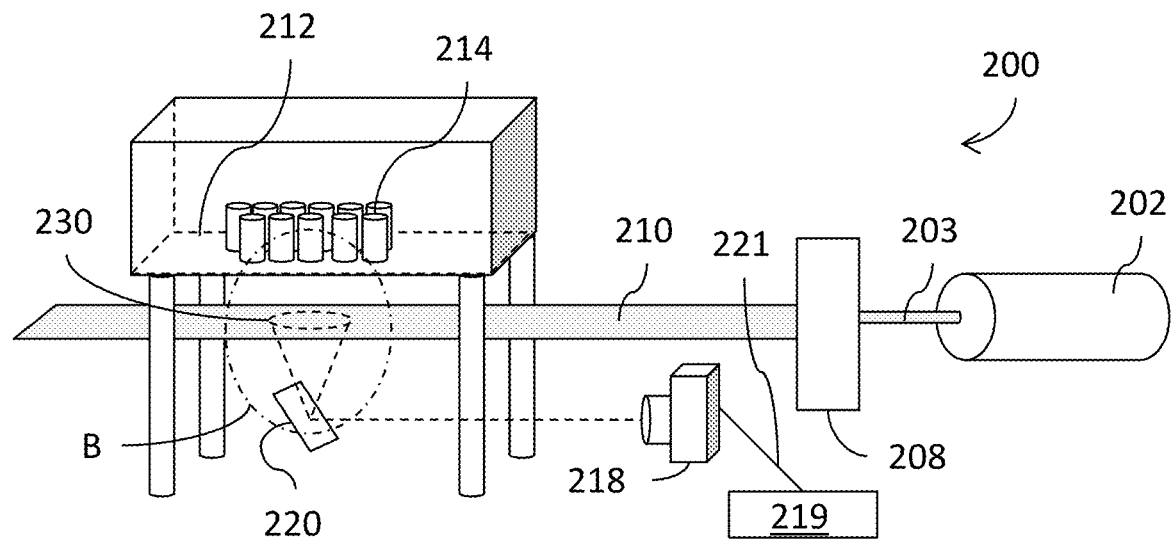
FIG. 3 schematically depicts a glass particle detection system, according to embodiments of this disclosure.

An example of embodiments of this disclosure is the glass particle detection system 200 schematically depicted in FIG. 3. The glass particle detection system 200 may include a light source 202 able to emit a light beam 203. The light beam 203 is directed toward an area below one or more glass articles 214 on a support surface 212. The support surface 212 can be the bottom of a shipping container, a processing line or conveyor, a basket or box, or other surface for holding, storing, processing, conveying, or testing the glass articles 214. In some embodiments, the support surface 212 has a porous or partially open surface to allow particles generated from the glass articles 214 to fall through the support surface 212. In embodiments, the support surface 212 can be part of or mounted on an accelerator table used to accelerate the glass articles 214, which can be used to generate particles in a laboratory setting to better understand particle generation behavior of the glass articles 214. The accelerator table can be programed to reproduce the types of accelerations that the glass articles 214 may experience in a particular setting (e.g., by programming the magnitude, frequency, and timing of oscillations from the accelerator table).

Figure 4:
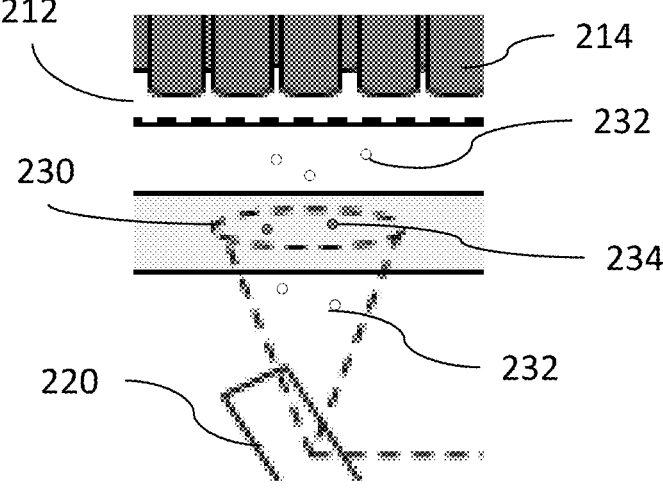
FIG. 4 is a close-up view of area B in FIG. 3, according to embodiments of this disclosure.

The particle detection system 200 is arranged for the light beam 212 to form a light sheet 210 under the support surface 212. The ability of the light beam 203 to be shaped into a thin light sheet 210 with a large irradiance allows for small airborne particles to be visualized by the particle detection system through one or more imaging or detection technologies, including both geometric and Mie scattering processes (size dependent) with a reasonable signal-to-noise ratio. FIG. 4 shows a close-up view of the area B below the support surface 212, including falling particles 232 and illuminated particles 234 as they fall through the light sheet 210. The light source 202 may be a laser emitting the light beam 203. The light beam 203 may be a line light. The light source 202 may be a diode laser including an array of laser diodes which project a line of light. The light source 202 may project a light sheet 210, or the light sheet 210 can be formed using optics 208. The optics 208 may include one or more lenses and/or other optics to manipulate the light beam 203 into a light sheet 210. In embodiments, the light sheet 210 may be formed by rapid movement or oscillation of the light source 202. In some embodiments, the light source 202 is a light source other than a laser, such as an LED light source, a visible light source, and infrared light source, etc.

The particle detection system 200 also includes a camera 218. The camera 218 is used to capture images of particles as they fall through, and are illuminated by, the light sheet 210 within an inspection area 230. One or more optical components or mirrors (220) may be positioned to direct an image of the particles within the inspection area 230 toward the camera 218. The camera 218 may be any device having an array of sensing devices capable of detecting radiation in an ultraviolet wavelength band, a visible light wavelength band, or an infrared wavelength band. The camera 218 may have a focal plane that is located in the inspection area 230. The camera 218 may include an optical lens. The camera 218 may capture an image of the light sheet 210, including any illuminated particles 234 within the light sheet 230.

The camera 218 may communicate with a computing device 219 via a communication path 221. The computing device 219 may include one or more processors, and a memory module. Each of the one or more processors may be any device capable of executing machine readable instructions. Accordingly, each of the one or more processors may be a controller, an integrated circuit, a microchip, a computer, or any other computing device. The one or more processors are coupled to the communication path 221 to communicate with the camera 218. The camera 218 may transmit the captured image of the light sheet 210 in the inspection area 230 to the processor of the computing device 219 via the communication path 221. In some embodiments, the camera 218 may include the one or more processors and the memory module. In some of such embodiments, the camera 218 may capture an image of the light sheet 210 and/or illuminated particles 234, process the image by the one or more processors, and store the processed image in the memory module, or send the processed image to the computing device 219.

The communication path 221 may be formed from any medium that is capable of transmitting a signal such as, for example, conductive wires, conductive traces, optical waveguides, or the like. In some embodiments, the communication path 221 may facilitate the transmission of wireless signals, such as WiFi, Bluetooth, Near Field Communication (NFC) and the like. Moreover, the communication path 221 may be formed from a combination of mediums capable of transmitting signals. In one embodiment, the communication path 221 comprises a combination of conductive traces, conductive wires, connectors, and buses that cooperate to permit the transmission of electrical data signals to components such as processors, memories, sensors, input devices, output devices, and communication devices. Accordingly, the communication path 221 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The one or more memory modules may comprise RAM, ROM, flash memories, hard drives, or any device capable of storing machine readable instructions such that the machine-readable instructions can be accessed by the one or more processors. The one or more memory modules may store images captured by the camera 218. The captured images may be processed by the one or more processors before being stored in the one or more memory modules. The machine-readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable instructions and stored on the one or more memory modules. Alternatively, the machine-readable instructions may be written in a hardware description language (HDL), such as logic implemented via either a field-programmable gate array (FPGA) configuration or an application-specific integrated circuit (ASIC), or their equivalents. Accordingly, the systems and methods described herein may be implemented in any conventional computer programming language, as pre-programmed hardware elements, or as a combination of hardware and software components.

According to embodiments of this disclosure, systems and methods are provided that enable the detection and counting a significant number, if not a majority or all, of the particles generated and not just the particles flung the furthest from contact, which was a limitation of existing methods. Embodiments are also able to ensure the detected particles are time-resolved. This affords several previously unknown insights into the particle generation, including: understanding when in time particle generation occurred; understanding the rate of particle generation; and understanding any time dependent, non-linear particle generation behavior. Systems and methods of this disclosure also enable the characterization of forces/accelerations necessary to generate particles on glass articles that do not generate particles at low forces.

According to embodiments, the camera may send a captured image to the one or more processors and the one or more processors may implement image processing on the captured image to remove any illumination, noise, particles, etc. outside a region of interest. With this processing, particles or noise shown in the camera view outside of a region of interest is removed while particles within the region of interest remains. Then, the one or more processors may determine whether any particle is present within the region of interest on the processed image. If it is determined that a particle is present within the region of interest on the processed image, the one or more processors may determine various properties of the particle (size, shape, location within the field of view, timing of particle generation, relationship with other particles detected, relationship between particle generation time and external conditions, etc.). The one or more processors may indicate that the glass article or articles should be rejected based on the determination, or that it is time for the area to be cleaned. The indication of rejection may be stored in the one or more memory modules along with the identification of the glass article group or lot. If it is determined that no particle is present within the region of interest on the processed image, the one or more processors may determine that no particle is present for the glass vials present above the field of view at the time that image was captured. The determination may be stored in the one or more memory modules along with the identification of the glass articles.

In embodiments, various processing methods may be implemented on the captured image in order to remove undesirable data on the image. For example, a threshold filter may be applied to the captured image to remove most of the unwanted artifacts from the image. The processing may also convert the captured image to a binary image. For example, particles captured on the image may be converted to white dots whereas the rest of the image may be converted to black dots, or a black or blue background. A particle filter may be applied to the captured image to remove any artifacts that do not persist after image processing. The various processing may effectively remove features in the image that are too small to be real particles.

With respect to particles in the region of interest, the camera or the one or more processors may implement processing of the image to affect the appearance of the detected particles. For example, the processing may be to enlarge the particles in the image relative to the background structure, or to adjust contrast, brightness, or another property. The enlargement processing is intentionally implemented to enhance the sensitivity of detecting particles. The actual particle size may be determined by applying a calibration to the image based on testing samples of known particle sizes.

EXAMPLES

Figure 5:
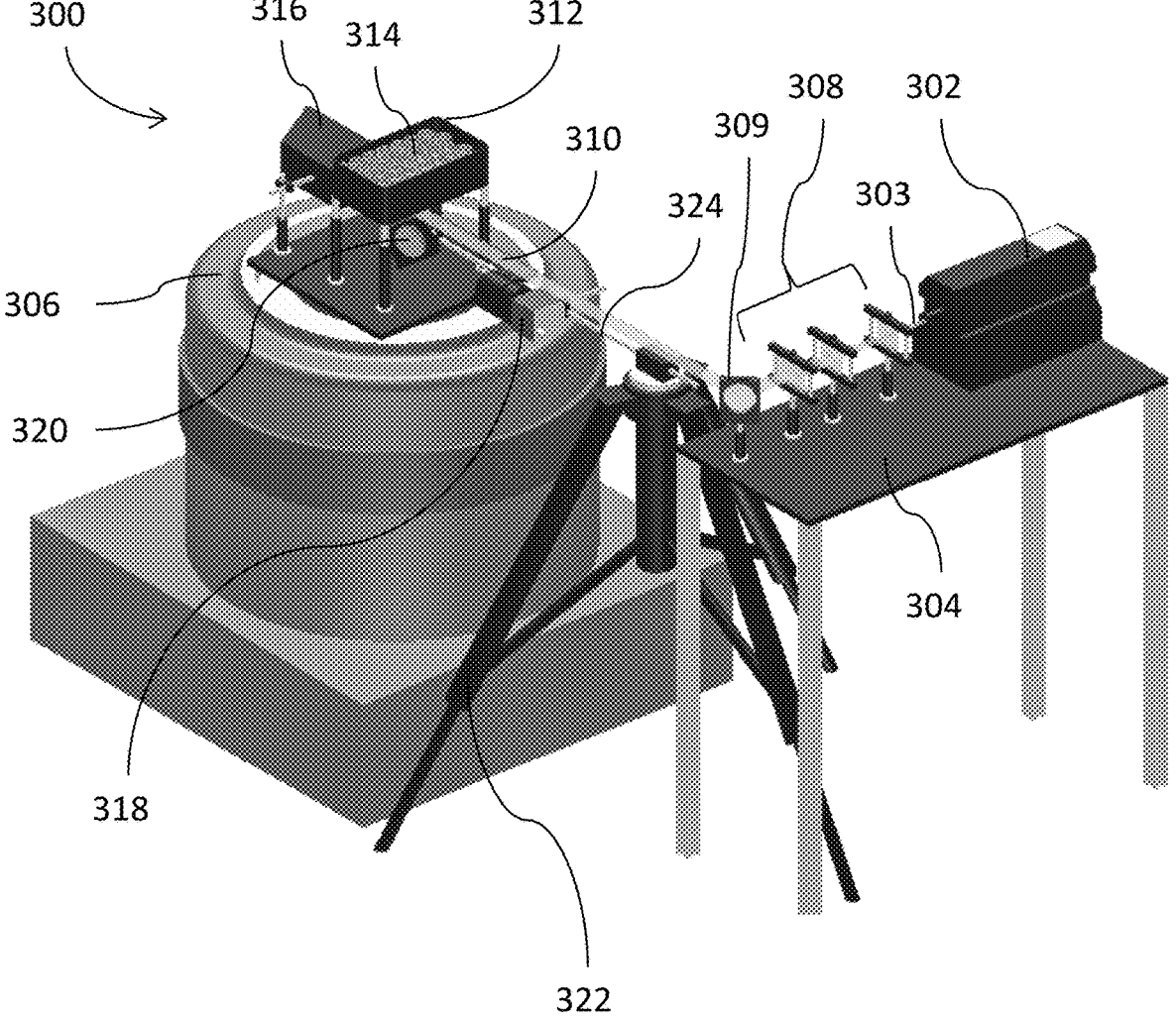
FIG. 5 is a depiction of an example glass particle detection system, according to embodiments of this disclosure.

FIG. 5 depicts an experimental setup of a particle detection system 300, according to embodiments of this disclosure. The particle detection system 300 was used to measure particles generated by glass pharmaceutical vials 314. The testing conditions, image capture and processing, and results are shown in FIGS. 6A-9C. The particle detection system 300 includes a laser light source 302, sheet-forming optics 308, a mirror 309, an accelerator table 306, a vial basket 312 for holding vials 314, a mirror 320, and a camera 318. The laser light source 302 and optics 308 are supported on an optical breadboard 304 and the camera 318 and mirror 320 are mounted to a tripod 322. Laser sheet imaging was selected as the illumination and imaging strategy. The ability of a laser beam 303 to be shaped into a thin laser sheet 310 with a large irradiance allows for small airborne particles to be visualized through both geometric and Mie scattering processes (size dependent) with a reasonable signal-to-noise ratio. The light source 302 offers more spatial control and particle detection capability than traditional high-powered LEDs or flashlights. A continuous wave Nd:YAG laser producing 532 nm laser light was selected as a light source 302. It was mounted on an optical breadboard 304 placed next to the accelerator table system 306. The beam was collimated into a horizontal laser sheet 310 with the use of cylindrical lenses 308. The shaper of the laser sheet 310 was approximately 20 mm wide and 3 mm thick. The laser sheet 310 was positioned to pass 20 mm under the vial basket 312 (containing vials 314) and collected into a beam dump 316. The precise arrangement of components is an example of embodiments of this disclosure. As would be understood by a person of ordinary skill in the art, some components are for convenience, practically, or compactness of the system 300, and some components are optional or could be rearranged depending on need.

For the camera 318, a Basler acA640-750 um USB camera 318 (from Basler AG) was used to image and detect particles as they crossed the laser sheet 310. Due to physical constraints, the camera 318 imaged the underside of the vial basket through an aluminum mirror 320 placed at an angle of 45 degrees. The camera 318 and mirror 320 were mounted onto a photographic tripod 322 using a mounting rod 324 so that they were isolated from the accelerator table 306. The camera was operated at 100 Hz, with an exposure time of 1 ms. For each test condition, the recording length was 15 minutes. A relatively high frame rate for the camera can facilitate the time-resolved detection methods compared to the thickness of the laser sheet. A relatively short exposure time can minimize background light collected, increasing the signal-to-noise ratio of the particles and making the subsequent particle identification through the software processing, via thresholding, easier.

The accelerator table used to activate the vials was set up via a Telcordia standard GR-63 profile. It is designed for simulating transportation shipping vibration. It is a Random vibration profile with a frequency range of 10-2000 Hz and 3.21 G. This vibration profile was used for testing and example purposes, only, and embodiments of this disclosure are not limited to a particular vibration profile or application. For example, the vibration profile could be programmed to simulate accelerations experienced by pharmaceutical vials on a manufacturing line or a filling line. The same break table profile was tested at 1 G, 2 G and 3 G as a step stress event for particle generation. Table 1 shows the reference break point values.

TABLE 1

| | | Reference Break Point Table. | | | | |
|---|---|---|---|---|---|---|
| BP# | Freq (Hz) | Level (g²/Hz) | Alarm− (−dB) | Alarm+ (+dB) | Abort− (−dB) | Abort+ (+dB) |
| 1 | 10.00 | 0.0100012 | −3.00 | 3.00 | −6.00 | 6.00 |
| 2 | 200.00 | 0.0100012 | −3.00 | 3.00 | −6.00 | 6.00 |
| 3 | 2000.00 | 0.0030004 | −3.00 | 3.00 | −6.00 | 6.00 |

Figure 6A:
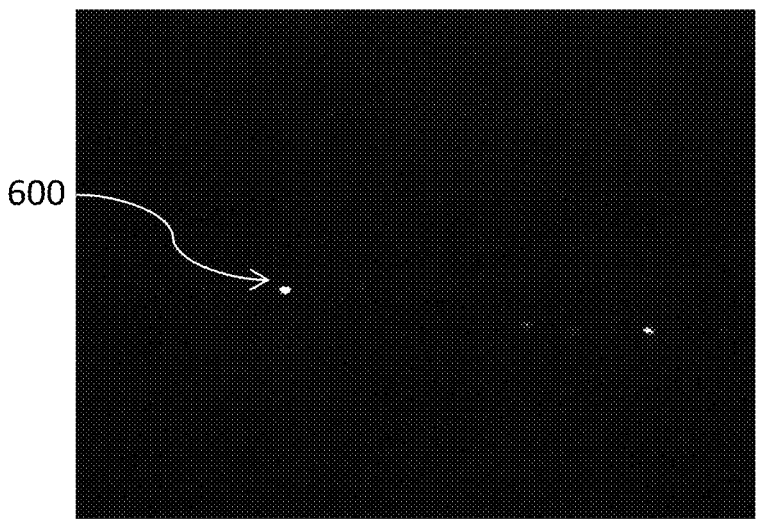
FIG. 6A is an image captured by a glass particle detection system, according to embodiments of this disclosure.
Figure 6B:
FIG. 6B is a processed version of the image in FIG. 6A after running an object identification routine, according to embodiments of this disclosure.

FIG. 6A shows an example image captured by the camera 318 during this experiment showing light reflected from particles 600 in the inspection area. While the vials 314 in the basket 312 were accelerated, lights in the room were turned off so that only light reflecting from the particles in the range of view were observed. The recorded data was processed using a purposely written Matlab algorithm. Each raw image of the sequence (e.g., FIG. 6A) was converted into a binary mask by setting every pixel below a certain threshold equal to zero, and every pixel above equal to one, resulting in the binary mark shown in FIG. 6B. The thresholds were chosen to be the chip saturation value (based on 255 counts). Once the captured image was converted into the binary mask, an object identification routine was run to count all detected particles and the value saved into an array. Additional image processing may be performed by the camera or a computing device external to the camera, including, for example, processing to remove any illumination, noise, particles, etc. in the image or outside of a region of interest in the image.

Figure 7A:
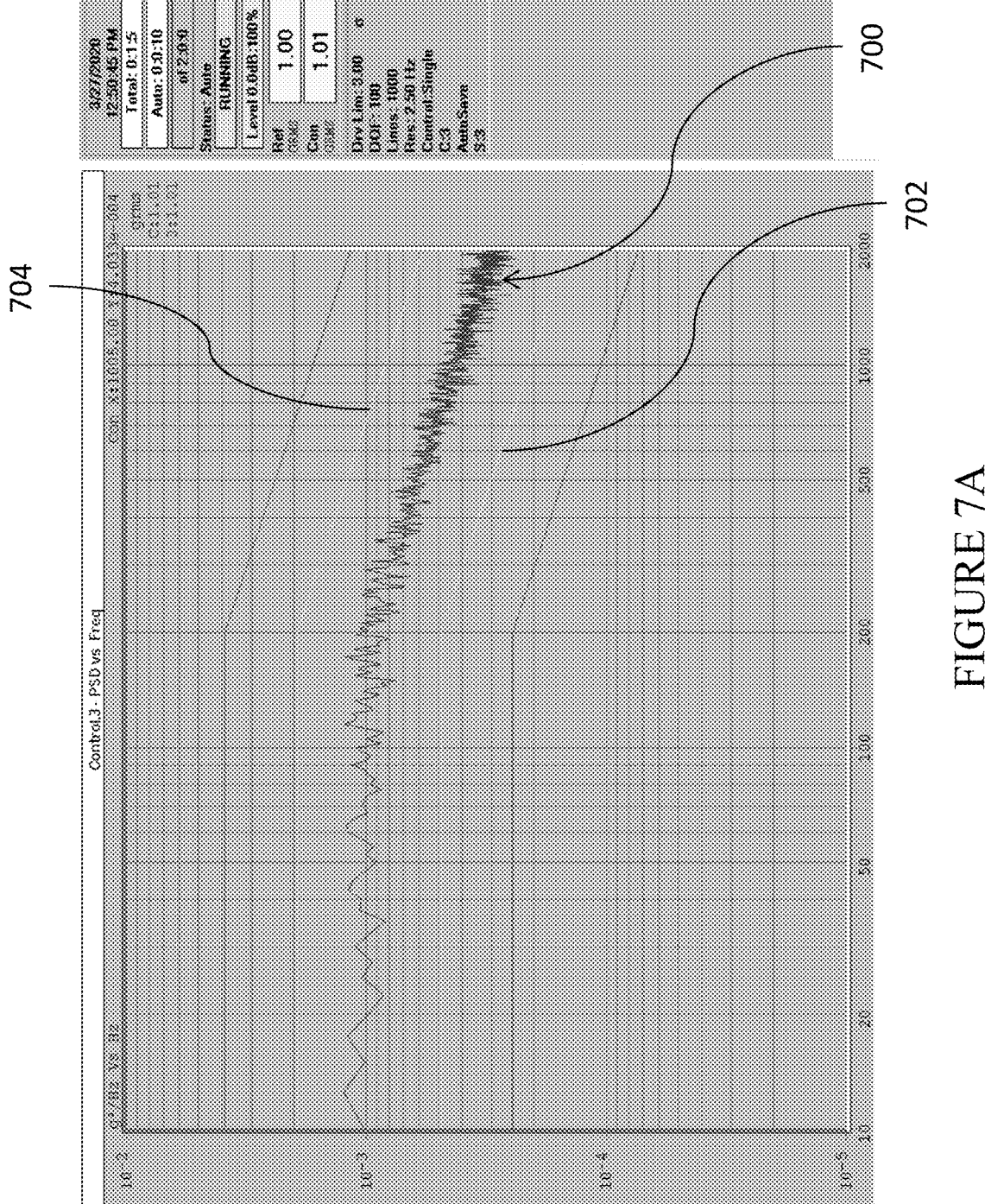
FIG. 7A is a plot of acceleration versus frequency for a first vibration pattern from an accelerator table running a vibration program, according to embodiments.
Figure 7B:
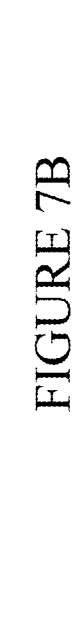
FIG. 7B is a plot of acceleration versus frequency for a second vibration pattern from an accelerator table running a vibration program, according to embodiments.
Figure 7C:
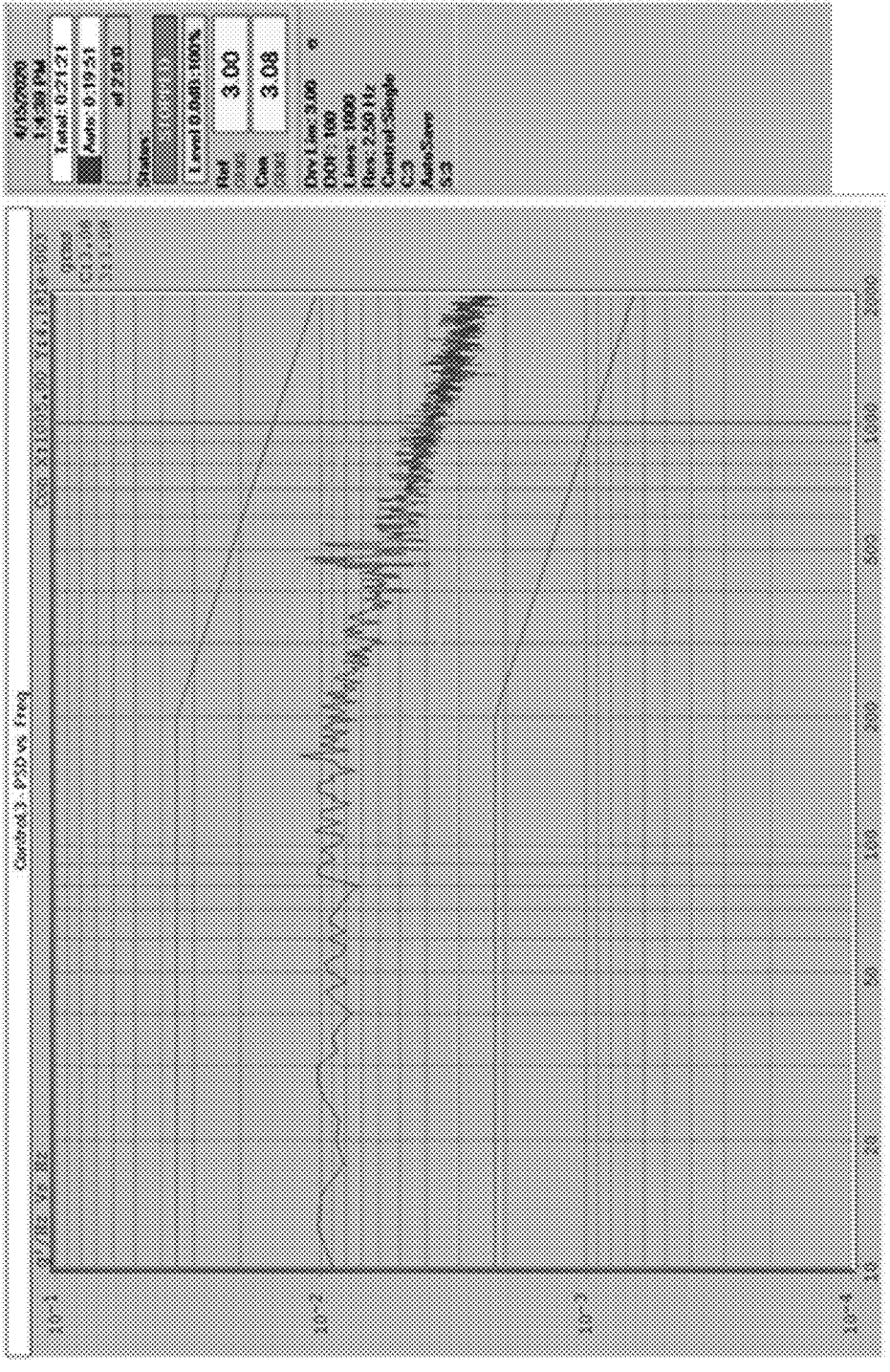
FIG. 7C is a plot of acceleration versus frequency for a third vibration pattern from an accelerator table running a vibration program, according to embodiments.

As mentioned above, the acceleration table was run at different levels. FIG. 7A shows a plot of the acceleration 700 at 1 G, with the acceleration level plotted versus the frequency. The acceleration table is designed to randomly access all frequencies within the cyan limit ranges 702, 704 as demonstrated in the image above. Similar plots are shown below for the acceleration for 2 G and 3 G in FIGS. 7B and 7C, respectively.

Figures 8A, 8B, 8C, 9A, 9B, 9C:
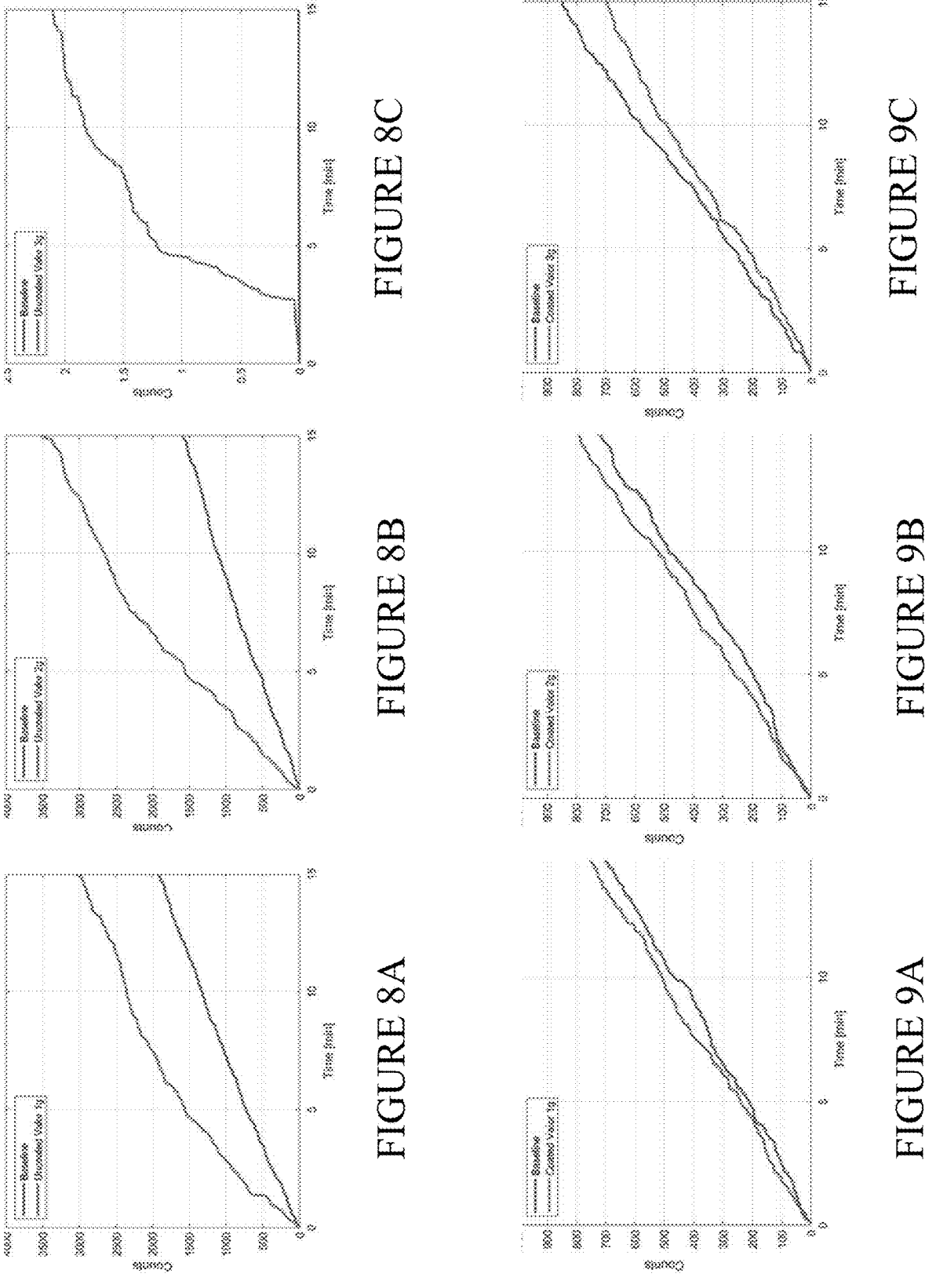
FIG. 8A is a plot of particle generation for uncoated containers in terms of particle count versus time based on an acceleration of 1 G, according to embodiments.
FIG. 8B is a plot of particle generation for uncoated containers in terms of particle count versus time based on an acceleration of 2 G, according to embodiments.
FIG. 8C is a plot of particle generation for uncoated containers in terms of particle count versus time based on an acceleration of 3 G, according to embodiments.
FIG. 9A is a plot of particle generation for coated containers in terms of particle count versus time based on an acceleration of 1 G, according to embodiments.
FIG. 9B is a plot of particle generation for coated containers in terms of particle count versus time based on an acceleration of 2 G, according to embodiments.
FIG. 9C is a plot of particle generation for coated containers in terms of particle count versus time based on an acceleration of 3 G, according to embodiments.

Experiments were run using Corning® Valor® pharmaceutical vials, with some runs using coated Valor® vials and some using uncoated Valor® vials. The processed data can be used to compare the vials, coated against uncoated. Embodiments are not limited to these specific vials, and other glass articles may be used or compared against these, including glass articles that are borosilicate or other compositions, or with different coating compositions, and/or different manufacturing parameters. FIGS. 8A, 8B, and 8C show the non-linear particle generation of the uncoated Valor® vials with acceleration force, at 1 G, 2 G, and 3 G, respectively, above a baseline. The baseline was determined based on particles counted with the experiment running without vials in the basket. The data show the non-linear generation of particles over time, indicating non-linear material durability. FIGS. 9A, 9B, and 9C show that coated Valor® vials essentially generate no particles above the room baseline for the different vibration forces tested (1 G, 2 G, and 3 G, respectively).

Glass Articles

The glass articles or containers described herein may have at least two performance attributes selected from resistance to delamination, improved strength, and increased damage resistance. For example, the glass containers may have a combination of resistance to delamination and improved strength; improved strength and increased damage resistance; or resistance to delamination and increased damage resistance. In one particular embodiment, a glass container having delamination resistance and improved strength may include a body having an inner surface, an outer surface and a wall thickness extending between the outer surface and the inner surface. The body may have a delamination factor less than or equal to 10. The body may also have a compressively stressed layer extending from the outer surface of the body into the wall thickness. The compressively stressed layer may have a surface compressive stress greater than or equal to 150 MPa. Glass containers with various combinations of resistance to delamination, improved strength, and increased damage resistance will be described in more detail herein with specific reference to the appended drawings.

In the embodiments of the glass compositions described herein, the concentration of constituent components (e.g., $SiO_2$, $Al_2O_3$, $B_2O_3$ and the like) are specified in mole percent (mol. %) on an oxide basis, unless otherwise specified.

The term "substantially free," when used to describe the concentration and/or absence of a particular constituent component in a glass composition, means that the constituent component is not intentionally added to the glass composition. However, the glass composition may contain traces of the constituent component as a contaminant or tramp in amounts of less than 0.1 mol. %.

The term "chemical durability," as used herein, refers to the ability of the glass composition to resist degradation upon exposure to specified chemical conditions. Specifically, the chemical durability of the glass compositions described herein may be assessed according to three established material testing standards: DIN 12116 dated March 2001 and entitled "Testing of glass—Resistance to attack by a boiling aqueous solution of hydrochloric acid—Method of test and classification"; ISO 695:1991 entitled "Glass—Resistance to attack by a boiling aqueous solution of mixed alkali—Method of test and classification"; ISO 720:1985 entitled "Glass—Hydrolytic resistance of glass grains at 121 degrees C.—Method of test and classification"; and ISO 719:1985 "Glass—Hydrolytic resistance of glass grains at 98 degrees C.—Method of test and classification." Each standard and the classifications within each standard are described in further detail herein. Alternatively, the chemical durability of a glass composition may be assessed according to USP <660> entitled "Surface Glass Test," and or European Pharmacopeia 3.2.1 entitled "Glass Containers For Pharmaceutical Use" which assess the durability of the surface of the glass.

The term "strain point" and "$T_{strain}$" as used herein, refer to the temperature at which the viscosity of the glass is $3 \times 10^{14}$ poise.

The term "softening point," as used herein, refers to the temperature at which the viscosity of the glass composition is $1 \times 10^{7.6}$ poise.

Conventional glass containers used for storing pharmaceuticals and/or other consumable products may experience damage during filling, packaging, and/or shipping. Such damage may be in the form of surface scuffs, abrasions and/or scratches which, when sufficiently deep, may result in a through crack or even complete failure of the glass container, thereby compromising the contents of the glass package.

In addition, some conventional glass containers may be susceptible to delamination, particularly when the glass container is formed from alkali borosilicate glasses. Delamination refers to a phenomenon in which glass particles are released from the surface of the glass following a series of leaching, corrosion, and/or weathering reactions. In general, the glass particles are silica-rich flakes of glass which originate from the inner surface of the package as a result of the leaching of modifier ions into a solution contained within the package. These flakes may generally be from about 1 nm to about 2 microns ($\mu$m) thick with a width greater than about 50 $\mu$m. As these flakes are primarily composed of silica, the flakes generally do not further degrade after being released from the surface of the glass.

It has heretofore been hypothesized that delamination is due to phase separation which occurs in alkali borosilicate glasses when the glass is exposed to the elevated temperatures used for reforming the glass into a container shape.

However, it is now believed that the delamination of the silica-rich glass flakes from the inner surfaces of the glass containers is due to the compositional characteristics of the glass container immediately following formation. Specifically, the high silica content of alkali borosilicate glasses causes the glass to have relatively high melting and forming temperatures. However, the alkali and borate components in the glass composition melt and/or vaporize at much lower temperatures. In particular, the borate species in the glass are highly volatile and evaporate from the surface of the glass at the high temperatures necessary to form and reform the glass.

Specifically, glass stock is reformed into glass containers at high temperatures and in direct flames. The high temperatures needed at higher equipment speeds cause the more volatile borate species to evaporate from portions of the surface of the glass. When this evaporation occurs within the interior volume of the glass container, the volatilized borate species are re-deposited in other areas of the glass container surface causing compositional heterogeneities in the glass container surface, particularly with respect to the near-surface regions of the interior of the glass container (i.e., those regions at or directly adjacent to the inner surfaces of the glass container). For example, as one end of a glass tube is closed to form the bottom or floor of the container, borate species may evaporate from the bottom portion of the tube and be re-deposited elsewhere in the tube. The evaporation of material from the heel and floor portions of the container is particularly pronounced as these areas of the container undergo the most extensive re-formation and, as such, are exposed to the highest temperatures. As a result, the areas of the container exposed to higher temperatures may have silica-rich surfaces. Other areas of the container which are amenable to boron deposition may have a boron-rich layer at the surface. Areas amenable to boron deposition which are at a temperature greater than the anneal point of the glass composition but less than the hottest temperature the glass is subjected to during reformation can lead to boron incorporation on the surface of the glass. Solutions contained in the container may leach the boron from the boron-rich layer. As the boron-rich layer is leached from the glass, a high silica glass network (gel) remains which swells and strains during hydration and eventually spalls from the surface.

The glass containers described herein mitigate at least two of the aforementioned problems. Specifically, the glass containers have at least two performance attributes selected from resistance to delamination, improved strength, and increased damage resistance. For example, the glass containers may have a combination of resistance to delamination and improved strength; improved strength and increased damage resistance; or resistance to delamination and increased damage resistance. Each performance attribute and methods for achieving the performance attribute will be described in further detail herein.

While the glass articles described herein may be described in reference to a particular form (i.e., a vial), it should be understood that the glass articles may have other shape forms, including, without limitation, Vacutainers®, cartridges, syringes, ampoules, bottles, flasks, phials, tubes, beakers, or the like. Further, it should be understood that the glass containers described herein may be used for a variety of applications including, without limitation, as pharmaceutical packages, beverage containers, or the like.

Strength

In some embodiments described herein, the glass article includes a compressively stressed layer extending from at least the outer surface of the body into the wall thickness to a depth of layer DOL from the outer surface of the body. The compressively stressed layer generally increases the strength of the glass container and also improves the damage tolerance of the glass container. Specifically, a glass container having a compressively stressed layer is generally able to withstand a greater degree of surface damage, such as scratches, chips, or the like, without failure compared to a non-strengthened glass container as the compressively stressed layer mitigates the propagation of cracks from surface damage in the compressively stressed layer.

In the embodiments described herein the depth of layer of the compressively stressed layer may be greater than or equal to about 3 $\mu$m. In some embodiments, the depth of layer may be greater than or equal to about 25 $\mu$m or even greater than or equal to about 30 $\mu$m. For example, in some embodiments, the depth of layer may be greater than or equal to about 25 $\mu$m and up to about 150 $\mu$m. In some other embodiments, the depth of layer may be greater than or equal to about 30 $\mu$m and less than or equal to about 150 $\mu$m. In yet other embodiments, the depth of layer may be greater than or equal to about 30 $\mu$m and less than or equal to about 80 $\mu$m. In some other embodiments, the depth of layer may be greater than or equal to about 35 $\mu$m and less than or equal to about 50 $\mu$m.

The compressively stressed layer generally has a surface compressive stress (i.e., a compressive stress as measured at the outer surface) of greater than or equal to 150 MPa. In some embodiments, the surface compressive stress may be greater than or equal to 200 MPa, or even greater than or equal to 250 MPa. In some embodiments, the surface compressive stress may be greater than or equal to 300 MPa, or even greater than or equal to 350 MPa. For example, in some embodiments, the surface compressive stress may be greater than or equal to about 300 MPa and less than or equal to about 750 MPa. In some other embodiments, the surface compressive stress may be greater than or equal to about 400 MPa and less than or equal to about 700 MPa. In still other embodiments, the surface compressive stress may be greater than or equal to about 500 MPa and less than or equal to about 650 MPa. The stress in ion-exchanged glass articles can be measured with an FSM (Fundamental Stress Meter) instrument. This instrument couples light into and out of the birefringent glass surface. The measured birefringence is then related to stress through a material constant, the stress-optic or photoelastic coefficient (SOC or PEC). Two parameters are obtained: the maximum surface compressive stress (CS) and the exchange depth of layer (DOL). Alternatively, the compressive stress and depth of layer may be measured using refractive near field stress measurement techniques.

While the compressively stressed layer has been shown and described herein as extending from the outer surface into the thickness Tw of the body, it should be understood that, in some embodiments, the body may further comprise a second compressively stressed layer which extends from the inner surface into the thickness of the body. In this embodiment, the depth of layer and surface compressive stress of the second compressively stressed layer may mirror those of the compressively stressed layer about the center-line of the thickness Tw of the body.

Several different techniques may be utilized to form the compressively stressed layer in the body of the glass container. For example, in embodiments where the body is formed from ion exchangeable glass, the compressively stressed layer may be formed in the body by ion exchange. In these embodiments, the compressively stressed layer is formed by placing the glass container in a bath of molten salt to facilitate the exchange of relatively large ions in the molten salt for relatively smaller ions in the glass. Several different exchange reactions may be utilized to achieve the compressively stressed layer. In one embodiment, the bath may contain molten $KNO_3$ salt while the glass from which the glass container is formed contains lithium and/or sodium ions. In this embodiment, the potassium ions in the bath are exchanged for the relatively smaller lithium and/or sodium ions in the glass, thereby forming the compressively stressed layer. In another embodiment, the bath may contain $NaNO_3$ salt and the glass from which the glass container is formed contains lithium ions. In this embodiment, the sodium ions in the bath are exchanged for the relatively smaller lithium ions in the glass, thereby forming the compressively stressed layer.

In one specific embodiment, the compressively stressed layer may be formed by submerging the glass container in a molten salt bath of 100% $KNO_3$ or, in the alternative, a mixture of $KNO_3$ and $NaNO_3$. For example, in one embodiment the molten salt bath may include $KNO_3$ with up to about 10% $NaNO_3$. In this embodiment, the glass from which the container is formed may include sodium ions and/or lithium ions. The temperature of the molten salt bath may be greater than or equal to 350° C. and less than or equal to 500° C. In some embodiments, the temperature of the molten salt bath may be greater than or equal to 400° C. and less than or equal to 500° C. In still other embodiments, the temperature of the molten salt bath may be greater than or equal to 450° C. and less than or equal to 475° C. The glass container may be held in the molten salt bath for a time period sufficient to facilitate the exchange of the relatively large ions in the salt bath with relatively smaller ions in the glass and thereby achieve the desired surface compressive stress and depth of layer. For example, the glass may be held in the molten salt bath for a period of time which is greater than or equal to 0.05 hours to less than or equal to about 20 hours in order to achieve the desired depth of layer and surface compressive stress. In some embodiments the glass container may be held in the molten salt bath for greater than or equal to 4 hours and less than or equal to about 12 hours. In other embodiments, the glass container may be held in the molten salt bath for greater than or equal to about 5 hours and less than or equal to about 8 hours. In one exemplary embodiment, the glass container may be ion exchanged in a molten salt bath which comprises 100% $KNO_3$ at a temperature greater than or equal to about 400° C. and less than or equal to about 500° C. for a time period greater than or equal to about 5 hours and less than or equal to about 8 hours.

Typically, the ion exchange process is performed at temperatures more than 150° C. below the strain point ($T_{strain}$) of the glass in order to minimize stress relaxation due to elevated temperatures. However, in some embodiments, the compressively stressed layer is formed in a molten salt bath which is at temperature greater than the strain point of the glass. This type of ion exchange strengthening is referred to herein as "high temperature ion-exchange strengthening." In high temperature ion-exchange strengthening, relatively smaller ions in the glass are exchanged with relatively larger ions from the molten salt bath, as described above. As the relatively smaller ions are exchanged for relatively larger ions at temperatures above the strain point, the resultant stress is released or "relaxed". However, the replacement of smaller ions in the glass with larger ions creates a surface layer in the glass which has a lower coefficient of thermal expansion (CTE) than the remainder of the glass. As the glass cools, the CTE differential between the surface of the glass and the remainder of the glass creates the compressively stressed layer. This high temperature ion-exchange technique is particularly well suited to strengthening glass articles, such as glass containers, which have complex geometries and typically reduces the strengthening process time relative to typical ion exchange processes and also enables a greater depth of layer.

In some embodiments, the compressively stressed layer may be introduced into the body of the glass container by thermal tempering. Compressively stressed layers are formed through thermal tempering by heating the glass container and differentially cooling the surface of the glass relative to the bulk of the glass. Specifically, a glass which is rapidly cooled has a greater molar volume (or lower density) than a more slowly cooled glass. Accordingly, if the surface of the glass is intentionally rapidly cooled, the surface of the glass will have a larger volume and the interior of the glass (i.e., the remainder of the glass below the outer surface) will necessarily cool at a slower rate as the heat must escape from the bulk through the surface. By creating a continuous gradient in molar volume (or thermal history/density) from the outer surface into the wall thickness Tw of the body, a compressively stressed layer is produced which has a parabolic stress profile (i.e., the compressive stress decreases parabolically with increasing distance from the outer surface of the body). Thermal tempering processes are generally faster and less expensive than ion-exchange processes. However, the surface compressive stresses due to thermal tempering processes are generally lower than the surface compressive stresses due to ion-exchange processes. In embodiments where the glass container is thermally tempered, the resultant compressively stressed layer extends from the outer surface 106 to a depth of layer DOL which is up to 22% of the wall thickness Tw of the glass containers. For example, in some embodiments, the DOL may be from about 5% to about 22% of the wall thickness Tw or even from about 10% to about 22% of the wall thickness Tw.

In a typical thermal tempering process, the glass container is first heated to its softening point and, thereafter, the outer surface of the body is rapidly cooled to below the softening point with a fluid, such as with a gas jet or the like, to create a temperature differential between the outer surface of the body and the remainder of the body, as described above. The temperature differential between the outer surface and the remainder of the body produces a compressively stressed layer extending into the wall thickness Tw of the body from the outer surface. For example, the glass may be initially heated to 50-150° C. above its softening point and thereafter rapidly cooled to room temperature by directing a fluid onto the glass. The fluid may include, without limitation, air, oil, or oil-based fluids.

In some embodiments, the glass container may be formed from laminated glass which facilitates the formation of a compressively stressed layer in at least the outer surface of the body. The laminated glass generally comprises a glass core layer and at least one glass cladding layer. The laminated glass may include a pair of glass cladding layers. In this embodiment, the glass core layer generally comprises a first surface and a second surface which is opposed to the first surface. A first glass cladding layer is fused to the first surface of the glass core layer and a second glass cladding layer is fused to the second surface of the glass core layer. The glass cladding layers are fused to the glass core layer without any additional materials, such as adhesives, coating layers or the like, disposed between the glass core layer and the glass cladding layers.

In embodiments, the glass core layer is formed from a first glass composition having an average core coefficient of thermal expansion $CTE_{core}$ and the glass cladding layers are formed from a second, different glass composition which has an average coefficient of thermal expansion $CTE_{clad}$. In the embodiments described herein, $CTE_{core}$ is not equal to $CTE_{clad}$ such that a compressive stress layer is present in at least one of the core layer or the cladding layer. In some embodiments, $CTE_{core}$ is greater than $CTE_{clad}$ which results in the glass cladding layers being compressively stressed without being ion exchanged or thermally tempered. In some other embodiments, such as when the laminate glass comprises a single core layer and a single cladding layer, $CTE_{clad}$ may be greater than $CTE_{core}$ which results in the glass core layer being compressively stressed without being ion exchanged or thermally tempered. The laminated glass may be formed by a fusion lamination process such as the process described in U.S. Pat. No. 4,214,886, which is incorporated herein by reference.

A sheet of laminated glass may be formed into a glass container by press molding, blow molding, or vacuum molding. For example, in one embodiment, the laminated glass sheet may be vacuum molded as described in U.S. Pat. No. 3,607,186, the entirety of which is incorporated herein by reference. Alternatively, the molten glass may be formed directly into laminated glass tubing as described in U.S. Pat. No. 4,023,953 which is incorporated herein by reference.

In some embodiments where the glass container is formed from laminated glass, the at least one cladding layer forms the inner surface of the body of the glass container such that the at least one glass cladding layer is in direct contact with product stored in the glass container. In these embodiments, the at least one cladding layer may be formed from a glass composition which is resistant to delamination, as described in further detail herein. Accordingly, it should be understood that the at least on cladding layer may have a delamination factor of less than or equal to 10, as described in further detail herein.

Based on the foregoing, it should be understood that, in some embodiments, the glass containers may include a compressively stressed layer which extends from at least the outer surface of the body into the wall thickness of the glass container. The compressively stressed layer improves the mechanical strength of the glass container relative to a glass container which does not include a compressively stressed layer. The compressively stressed layer also improves the damage tolerance of the glass container such that the glass container is able to withstand greater surface damage (i.e., scratches, chips, etc., which extend deeper into the wall thickness of the glass container) without failure relative to a glass container which does not include a compressively stressed layer. Further, it should also be understood that, in these embodiments, the compressively stressed layer may be formed in the glass container by ion exchange, by thermal tempering, or by forming the glass container from laminated glass. In some embodiments, the compressively stressed layer may be formed by a combination of these techniques.

Delamination Resistance

In some embodiments, the glass containers may also resist delamination following long term exposure to certain chemical compositions stored in the container. As noted above, delamination may result in the release of silica-rich glass flakes into a solution contained within the glass container after extended exposure to the solution. Accordingly, the resistance to delamination may be characterized by the number of glass particulates present in a solution contained within the glass container after exposure to the solution under specific conditions.

In some embodiments, a glass container having a delamination factor of 10 or lower may be obtained by forming the glass container with a barrier coating on the inner surface of the body such that the barrier coating is the inner surface of the body. For example, a glass container may have a barrier coating deposited on at least a portion of the inner surface of the body. The barrier coating does not delaminate or otherwise degrade and prevents product stored in the interior volume of the glass container, such as pharmaceutical compositions or the like, from contacting the inner surface of the body thereby mitigating delamination of the glass container. The barrier coating is generally non-permeable to aqueous solutions, is insoluble in water, and hydrolytically stable.

In some embodiments described herein, the barrier coating is a tenacious inorganic coating that is permanently adhered to the inner surface of the glass container. For example, in some embodiments, the tenacious inorganic coating may be formed from at least one metal oxide such as $Al_2O_3$, $TiO_2$, $ZrO_2$, $SnO$, $SiO_2$, $Ta_2O_5$, $Nb_2O_5$, $Cr_2O_3$, $V_2O_5$, $ZnO$, or $HfO_2$. In some other embodiments, the tenacious inorganic coating may be formed from a combination of two or more of metal oxides such as $Al_2O_3$, $TiO_2$, $ZrO_2$, $SnO$, $SiO_2$, $Ta_2O_5$, $Nb_2O_5$, $Cr_2O_3$, $V_2O_5$, $ZnO$, or $HfO_2$. In some other embodiments, the barrier coating may comprise a first layer of a first metal oxide deposited on the inner surface of the glass container and a second layer of a second metal oxide deposited over the first layer. In these embodiments, the barrier coating may be deposited using a variety of deposition techniques including, without limitation, atomic layer deposition, chemical vapor deposition, physical vapor deposition, and the like. Alternatively, the barrier coating may be applied with one or more liquid application techniques such as dip coating, spray coating or plasma coating. Spray coating techniques may include high volume low pressure (HVLP) and low volume low pressure (LVLP) spray coating, electrostatic spray coating, airless spray coating, ultrasonic atomization with airless spray coating, aerosol jet coating, and ink jet coating. Plasma coating techniques may include standard primary and secondary plasma coating, microwave assisted plasma coating, and atmospheric plasma coating and the like.

While embodiments of the barrier coating have been described herein as comprising inorganic materials, it should be understood that, in some embodiments, the barrier coating may be an organic coating. For example, in embodiments where the barrier coating is an organic coating, the organic coating may comprise polybenzimidazoles, polybisoxazoles, polybisthiazoles, polyetherimides, polyquinolines, polythiophenes, phenylene sulfides, polysulfones, polycyanurates, parylenes, fluorinated polyolefins including polytetrafluorethylenes and other fluoro-substituted polyolefins, perfluoroalkoxy polymers, polyether ether ketones (PEEK), polyamides, epoxies, polyphenolics, poly-urethane acrylates, cyclic olefin copolymer and cyclic olefin polymers, polyolefins including polyethylenes, oxidized polyethylenes, polypropylenes, polyethylene/propylene copolymers, polyethylene/vinyl acetate copolymers, polyvinylchloride, polyacrylates, polymethacrylates, polystyrenes, polyterpenes, polyanhydrides, polymaleicanhydrides, polyformaldehydes, polyacetals and copolymers of polyacetals, polysiloxanes of dimethyl or diphenyl or methyl/phenyl mixtures, perfluorinated siloxanes and other substituted siloxanes, polyimides, polycarbonates, polyesters, paraffins and waxes, or various combinations thereof. In some embodiments, the organic coating used as a barrier coating 131 may include polysiloxanes of dimethyl, diphenyl, or methyl/phenyl mixtures. Alternatively, the organic coating may be a polycarbonate or polyethylene terephthalate. In some embodiments, the barrier coating may be formed from a layered structure comprising one or more of the aforementioned polymers and/or copolymers.

Barrier coatings may be utilized in conjunction with glass containers formed from any glass composition. However, barrier coatings are particularly well suited for use with glass containers formed from glass compositions which do not exhibit a resistance to delamination upon formation into a glass container. Such glass compositions may include, without limitation, those glass compositions designated as Type I Class A, Type I Class B, and Type II glass compositions according to ASTM Standard E438-92 (2011) entitled "Standard Specification for Glasses in Laboratory Apparatus." Such glass compositions may have the requisite chemical durability under the ASTM Standard, but do not exhibit resistance to delamination.

In embodiments where the glass container is formed such that the glass container has a persistent layer homogeneity, the phrase "persistent layer homogeneity" means that the concentration of the constituent components (e.g., $SiO_2$, $Al_2O_3$, $Na_2O$, etc.) of the glass composition in the interior region do not vary from the concentration of the same constituent components at the midpoint of a thickness of the glass layer which contains the interior region by an amount which would result in delamination of the glass body upon long term exposure to a solution contained within the glass container. For example, in embodiments where the glass container is formed from a single glass composition, the glass body contains a single layer of glass and the concentration of constituent components in the interior region is compared to the concentration of the same components at a point along the midpoint line MP which evenly bisects the glass body between the inner surface and the outer surface to determine if a persistent layer homogeneity is present. However, in embodiments where the glass container is formed from a laminated glass in which a glass cladding layer of the laminated glass forms the interior surface of the glass container, the concentration of constituent components in the interior region is compared to the concentration of the same components at a point along the midpoint line which evenly bisects the glass cladding layer that forms the interior surface of the glass container. In the embodiments described herein, the persistent layer homogeneity in the interior region of the glass body is such that an extrema (i.e., the minimum or maximum) of a layer concentration of each of the constituent components of the glass composition in the interior region is greater than or equal to about 80% and less than or equal to about 120% of the same constituent component at a midpoint of the glass layer which contains the interior region. The persistent layer homogeneity, as used herein, refers to the state of the glass container when the glass container is in as-formed condition or following one or more surface treatments applied to at least the interior surface of the glass container, such as etching or the like. In other embodiments, the persistent layer homogeneity in the interior region of the glass body is such that the extrema of the layer concentration of each of the constituent components of the glass composition in the interior region is greater than or equal to about 90% and less than or equal to about 110% of the same constituent component at the midpoint of the thickness of the glass layer which contains the interior region. In still other embodiments, the persistent layer homogeneity in the interior region of the glass body is such that the extrema of the layer concentration of each of the constituent components of the glass composition in the interior region is greater than or equal to about 92% and less than or equal to about 108% of the same constituent component at the midpoint of the thickness of the glass of the glass layer which contains the interior region. In some embodiments, the persistent layer homogeneity is exclusive of constituent components of the glass composition which are present in an amount less than about 2 mol. %.

The term "as-formed condition," as used herein, refers to the composition of the glass container after the glass container has been formed from glass stock but prior to the container being exposed to any additional processing steps, such as ion-exchange strengthening, coating, ammonium sulfate treatment or the like. In some embodiments, the term "as-formed condition" includes the composition of the glass container after the glass container has been formed and exposed to an etching treatment to selectively remove all or a portion of at least the interior surface of the glass container. In the embodiments described herein, the layer concentration of the constituent components in the glass composition is determined by collecting a composition sample through the thickness of the glass body in the area of interest using dynamic secondary ion mass spectroscopy (DSIMS). In the embodiments described herein, the composition profile is sampled from areas of the inner surface of the glass body. The sampled areas have a maximum area of 1 $mm^2$. This technique yields a compositional profile of the species in the glass as a function of depth from the inner surface of the glass body for the sampled area.

Forming the glass container with a persistent layer homogeneity as described above, generally improves the resistance of the glass container to delamination. Specifically, providing an interior region which is homogenous in composition (i.e., the extrema of the concentration of the constituent components in the interior region is within +/−20% of the same constituent components at the midpoint of the thickness of the glass of the glass layer which contains the interior region) avoids the localized concentration of constituent components of the glass composition which may be susceptible to leaching which, in turn, mitigates the loss of glass particles from the inner surface of the glass container in the event that these constituent components are leached from the glass surface.

As noted herein, the container with the persistent layer homogeneity in as-formed condition is free from coatings, including inorganic and/or organic coatings applied to the inner surface of the of the glass body. Accordingly, it should be understood that the body of the glass container is formed from a substantially unitary composition which extends from the inner surface of the body to a depth of at least 250 nm or even at least 300 nm. The term "unitary composition" refers to the fact that the glass from which the portion of the body extending from the inner surface into the thickness of the body to a depth of at least 250 nm or even at least than 300 nm is a single composition of material as compared to a coating material applied to another material of either the same or different composition. For example, in some embodiments, the body of the container may be constructed from a single glass composition. In other embodiments, the body of the container may be constructed from a laminated glass such that the inner surface of the body has a unitary composition which extends from the inner surface to a depth of at least 250 nm or even at least 300 nm. The glass container may include an interior region which extends from either the inner surface or from 10 nm below the inner surface to a depth of at least 100 nm, as noted above. This interior region may have a persistent layer homogeneity.

In some embodiments described herein, the body of the glass container is etched to remove a layer of glass material from the inner surface of the glass body. The etch is sufficient to remove the thin skin layer of volatized and re-deposited species and thereby provide a persistent layer homogeneity and/or a persistent surface homogeneity to at least the inner surface of the body of the glass container such that at least the inner surface of the glass body has a delamination factor of 10 or less. For example, in some embodiments, the body of the glass container is etched to remove glass material from the inner surface of the glass body to a depth of 1 μm or even 1.5 μm. In some other embodiments, the body of the glass container may be etched to remove glass material to a depth greater than 1.5 μm, including, without limitation, 2 μm, 3 μm or even 5 μm. In these embodiments, at least the interior surface of the glass container may be formed from glass compositions which meet the criteria for Type I, Class A (Type IA) or Type I, Class B (Type IB) glasses under ASTM Standard E438-92 (2011) entitled "Standard Specification for Glasses in Laboratory Apparatus". Borosilicate glasses meet the Type I (A or B) criteria and are routinely used for pharmaceutical packaging. Examples of borosilicate glass include, without limitation, Corning® Pyrex® 7740, 7800, Wheaton 180, 200, and 400, Schott Duran®, Schott Fiolax®, KIMAX® N-51A, Gerrescheimer GX-51 Flint and others.

Certain constituent components of the glass composition may be sufficiently volatile at the glass forming and reforming temperatures which, in turn, may lead to compositional heterogeneities and subsequent delamination. Forming and reforming temperatures of the glass composition generally correspond to the temperatures at which the glass composition has a viscosity in the range from about 200 poise to about 100 kilopoise. Accordingly, in some embodiments, the glass compositions from which the glass containers are formed are free from constituent components which form species that volatilize significantly (i.e., form gas phase species with equilibrium partial pressures greater than about 10-3 atm) at temperatures corresponding to a viscosity in the range from about 200 poise to about 100 kilopoise. In some embodiments, the glass compositions from which the glass containers are formed are free from constituent components which volatilize significantly at temperatures corresponding to a viscosity in the range from about 1 kilopoise to about 50 kilopoise. In some other embodiments, the glass compositions from which the glass containers are formed are free from constituent components which volatilize significantly at temperatures corresponding to a viscosity in the range from about 1 kilopoise to about 20 kilopoise. In some other embodiments, the glass compositions from which the glass containers are formed are free from constituent components which volatilize significantly at temperatures corresponding to a viscosity in the range from about 1 kilopoise to about 10 kilopoise. Without wishing to be bound by theory, compounds which volatilize significantly under these conditions include, without limitation, boron and compounds of boron, phosphorous and compounds of phosphorous, zinc and compounds of zinc, fluorine and compounds of fluorine, chlorine and compounds of chlorine, tin and compounds of tin, and sodium and compounds of sodium.

In some embodiments described herein, the glass containers are generally formed from aluminosilicate glass compositions, such as alkali aluminosilicate glass compositions or alkaline-earth aluminosilicate glass compositions, for example. As noted hereinabove, boron containing species in the glass are highly volatile at the elevated temperatures used for glass forming and reforming which leads to delamination of the resultant glass container. Moreover, glass compositions containing boron are also susceptible to phase separation. Accordingly, in the embodiments described herein, the boron concentration in the glass compositions from which the glass containers are formed is limited to mitigate both delamination and phase separation. In some embodiments, the glass compositions from which the glass containers are formed includes less than or equal to about 1.0 mol. % of oxides of boron and/or compounds containing boron, including, without limitation, $B_2O_3$. In some of these embodiments, the concentration of oxides of boron and/or compounds containing boron in the glass composition may be less than or equal to about 0.5 mol. %, less than or equal to about 0.4 mol. % or even less than or equal to about 0.3 mol. %. In some of these embodiments, the concentration of oxides of boron and/or compounds containing boron in the glass composition may be less than or equal to about 0.2 mol. % or even less than or equal to about 0.1 mol. %. In some other embodiments, the glass compositions are substantially free from boron and compounds containing boron.

Phosphorous, like boron, generally forms species in the glass composition which are highly volatile at the elevated temperatures used for glass forming and reforming. As such, phosphorous in the glass composition can lead to compositional heterogeneities in the finished glass container which, in turn, may lead to delamination. Accordingly, in the embodiments described herein, the concentration of phosphorous and compounds containing phosphorous (such as $P_2O_5$ or the like) in the glass compositions from which the glass containers are formed is limited to mitigate delamination. In some embodiments, the glass compositions from which the glass containers are made includes less than or equal to about 0.3 mol. % of oxides of phosphorous and/or compounds containing phosphorous. In some of these embodiments, the concentration of oxides of phosphorous and/or compounds containing phosphorous in the glass composition may be less than or equal to about 0.2 mol. % or even less than or equal to about 0.1 mol. %. In some other embodiments, the glass compositions are substantially free from phosphorous and compounds containing phosphorous.

Zinc, like boron and phosphorous, generally forms species in the glass composition which are highly volatile at the elevated temperatures used for glass forming and reforming. As such, zinc in the glass composition can lead to compositional heterogeneities in the finished glass container which, in turn, may lead to delamination. Accordingly, in the embodiments described herein, the concentration of zinc and compounds containing zinc (such as ZnO or the like) in the glass compositions from which the glass containers are formed is limited to mitigate delamination. In some embodiments, the glass compositions from which the glass containers are made includes less than or equal to about 0.5 mol. % of oxides of zinc and/or compounds containing zinc. In some other embodiments, the glass compositions from which the glass containers are made includes less than or equal to about 0.3 mol. % of oxides of zinc and/or compounds containing zinc. In some of these embodiments, the concentration of oxides of zinc or compounds containing zinc in the glass composition may be less than or equal to about 0.2 mol. % or even less than or equal to about 0.1 mol. %. In some other embodiments, the glass compositions are substantially free from zinc and compounds containing zinc.

Lead and bismuth also form species in the glass composition which are highly volatile at the elevated temperatures used for glass forming and reforming. Accordingly, in the embodiments described herein, the concentration of lead, bismuth, compounds containing lead, and compounds containing bismuth in the glass compositions from which the glass containers are formed is limited to mitigate delamination. In some embodiments, oxides of lead, oxides of bismuth, compounds containing lead and/or compounds containing bismuth, are each present in the glass compositions in concentrations of less than or equal to about 0.3 mol. %. In some of these embodiments, oxides of lead, oxides of bismuth, compounds containing lead and/or, compounds containing bismuth are each present in the glass compositions in concentrations of less than or equal to about 0.2 mol. % or even concentrations of less than about 0.1 mol. %. In some other embodiments, the glass compositions are substantially free from lead and/or bismuth and compounds containing lead and/or bismuth.

Species containing chlorine, fluorine, and oxides of tin, are also highly volatile at the elevated temperatures used for glass forming and reforming. Accordingly, in the embodiments described herein, chlorine, fluorine, and oxides of tin and compounds containing tin, chlorine, or fluorine, are present in the glass compositions in concentrations which do not affect the resistance to delamination of the resultant glass. Specifically, chlorine, fluorine, and oxides of tin and compounds containing tin, chlorine, or fluorine, are present in the glass compositions from which the glass containers are formed in concentrations less than or equal to about 0.5 mol. % or even less than or equal to about 0.3 mol. %. In some embodiments, the glass compositions are substantially free from tin, chlorine, and fluorine, and compounds containing tin, chlorine, or fluorine.

While some embodiments of the glass container may be free from readily volatized constituent components as described above, in certain other embodiments the glass containers may be formed from glass compositions which include these volatile constituents, such as when the glass container includes a barrier layer.

The glass compositions from which the containers are formed are not phase separated. The term "phase separated," as used herein, refers to the separation of the glass composition into separate phases with each phase having different compositional characteristics. For example, alkali borosilicate glasses are generally known to phase separate at elevated temperatures (such as the forming and reforming temperatures) into a boron-rich phase and a silica-rich phase. In some embodiments described herein, the concentration of oxides of boron in the glass compositions is sufficiently low (i.e., less than or equal to about 1.0 mol. %) such that the glass compositions do not undergo phase separation.

The glass compositions described herein may be shaped into various forms such as, for example, sheets, tubes or the like. Chemically durable glass compositions are particularly well suited for use in the formation of pharmaceutical packages for containing a pharmaceutical formulation, such as liquids, powders and the like. For example, the glass compositions described herein may be used to form glass containers such as vials, ampoules, cartridges, syringe bodies and/or any other glass container for storing pharmaceutical formulations. Moreover, the ability to chemically strengthen the glass compositions through ion exchange can be utilized to improve the mechanical durability of such pharmaceutical packaging. Accordingly, it should be understood that, in at least one embodiment, the glass compositions are incorporated in a pharmaceutical package in order to improve the chemical durability and/or the mechanical durability of the pharmaceutical packaging.

Further, in some embodiments, the glass containers may be formed from glass compositions that are chemically durable and resistant to degradation as determined by the DIN 12116 standard, the ISO 695 standard, the ISO 719 standard, the ISO 720 standard, the USP <660> test and/or the European Pharmacopeia 3.2.1 test.

Specifically, the DIN 12116 standard is a measure of the resistance of the glass to decomposition when placed in an acidic solution. The DIN 12116 standard is broken into individual classes. Class S1 indicates weight losses of up to 0.7 mg/dm$^2$; Class S2 indicates weight losses from 0.7 mg/dm$^2$ up to 1.5 mg/dm$^2$; Class S3 indicates weight losses from 1.5 mg/dm$^2$ up to 15 mg/dm$^2$; and Class S4 indicates weight losses of more than 15 mg/dm$^2$. The glass compositions described herein have an acid resistance of class S3 or better according to DIN 12116 with some embodiments having an acid resistance of at least class S2 or better or even class S1. It should be understood that lower class rankings have improved acid resistance performance. Accordingly, a composition graded at S1 has better acid resistance than a composition graded at class S2.

The ISO 695 standard is a measure of the resistance of the glass to decomposition when placed in a basic solution. The ISO 695 standard is broken into individual classes. Class A1 indicates weight losses of up to 75 mg/dm$^2$; Class A2 indicates weight losses from 75 mg/dm$^2$ up to 175 mg/dm$^2$; and Class A3 indicates weight losses of more than 175 mg/dm$^2$. The glass compositions described herein have a base resistance according to ISO 695 of class A2 or better with some embodiments having a class A1 base resistance. Is should be understood that lower class rankings have improved base resistance performance. Accordingly, a composition graded at A1 has better base resistance than a composition graded at class A2.

The glass compositions from which the glass containers are formed are chemically durable and resistant to degradation as determined by the ISO 720 standard. The ISO 720 standard is a measure of the resistance of the glass to degradation in distilled water (i.e., the hydrolytic resistance of the glass). Non-ion exchanged samples of glass are assessed according to the ISO 720 protocol. Ion exchanged samples of glass are assessed with a modified ISO 720 protocol in which the glass is crushed to the grain size required in the ISO 720 standard, ion exchanged in a molten salt bath of 100% KNO$_3$ at a temperature of 450° C. for at least 5 hours to induce a compressive stress layer in the individual grains of glass, and then tested according to the ISO 720 standard. The ISO 720 standard is broken into individual types. Type HGA1 is indicative of up to 62 μg extracted equivalent of Na$_2$O; Type HGA2 is indicative of more than 62 μg and up to 527 μg extracted equivalent of Na$_2$O; and Type HGA3 is indicative of more than 527 μg and up to 930 μg extracted equivalent of Na$_2$O. The glass compositions described herein have an ISO 720 hydrolytic resistance of type HGA2 or better with some embodiments having a type HGA1 hydrolytic resistance or better. Is should be understood that lower class rankings have improved hydrolytic resistance performance. Accordingly, a composition graded at HGA1 has better hydrolytic resistance than a composition graded at HGA2.

The glass compositions from which the glass containers are formed are also chemically durable and resistant to degradation as determined by the ISO 719 standard. The ISO 719 standard is a measure of the resistance of the glass to degradation in distilled water (i.e., the hydrolytic resistance of the glass). Non-ion exchanged samples of glass are assessed according to the ISO 719 protocol. Ion exchanged samples of glass are assessed with a modified ISO 719 protocol in which the glass is crushed to the grain size required in the ISO 719 standard, ion exchanged in a molten salt bath of 100% $KNO_3$ at a temperature of 450° C. for at least 5 hours to induce a compressive stress layer in the individual grains of glass, and then tested according to the ISO 719 standard. The ISO 719 standard is broken into individual types. Type HGB1 is indicative of up to 31 μg extracted equivalent of $Na_2O$; Type HGB2 is indicative of more than 31 μg and up to 62 μg extracted equivalent of $Na_2O$; Type HGB3 is indicative of more than 62 μg and up to 264 μg extracted equivalent of $Na_2O$; Type HGB4 is indicative of more than 264 μg and up to 620 μg extracted equivalent of $Na_2O$; and Type HGB5 is indicative of more than 620 μg and up to 1085 μg extracted equivalent of $Na_2O$. The glass compositions described herein have an ISO 719 hydrolytic resistance of type HGB2 or better with some embodiments having a type HGB1 hydrolytic resistance. Is should be understood that lower class rankings have improved hydrolytic resistance performance. Accordingly, a composition graded at HGB1 has better hydrolytic resistance than a composition graded at HGB2.

With respect to the USP <660> test and/or the European Pharmacopeia 3.2.1 test, the glass containers described herein have a Type 1 chemical durability. As noted above, the USP <660> and European Pharmacopeia 3.2.1 tests are performed on intact glass containers rather than crushed grains of glass and, as such, the USP <660> and European Pharmacopeia 3.2.1 tests may be used to directly assess the chemical durability of the inner surface of the glass containers.

It should be understood that, when referring to the above referenced classifications according to ISO 719, ISO 720, ISO 695, and DIN 12116, a glass composition or glass article which has a specified classification "or better" means that the performance of the glass composition is as good as or better than the specified classification. For example, a glass article which has an ISO 719 hydrolytic resistance of "HGB2" or better may have an ISO 719 classification of either HGB2 or HGB1.

Damage Resistance

As noted herein above, glass containers may be subject to damage, such as impact damage, scratches and/or abrasions, as the containers are processed and filled. Such damage is often caused by contact between individual glass containers or contact between the glass containers and manufacturing equipment. This damage generally decreases the mechanical strength of the container and may lead to through-cracks which can compromise the integrity of the contents of the container. Accordingly, in some embodiments described herein, the glass containers further include a lubricous coating positioned on at least a portion of the outer surface of the body. The lubricous coating decreases the coefficient of friction of the portion of the body with the coating and, as such, decreases the occurrence of abrasions and surface damage on the outer surface of the glass body. In essence, the coating allows the container to "slip" relative to another object (or container) thereby reducing the possibility of surface damage on the glass. Moreover, the lubricous coating also cushions the body of the glass container, thereby lessening the effect of blunt impact damage to the glass container.

The term lubricous, as used herein, means that the coating applied to the outer surface of the glass container has a lower coefficient of friction than the uncoated glass container thereby providing the glass container with an improved resistance to damage such as scuffs, abrasions or the like.

Various properties of the coated glass containers (i.e., coefficient of friction, horizontal compression strength, 4-point bend strength, transparency, colorlessness and the like) may be measured when the coated glass containers are in an as-coated condition (i.e., following application of the coating without any additional treatments) or following one or more processing treatments, such as those similar or identical to treatments performed on a pharmaceutical filling line, including, without limitation, washing, lyophilization, depyrogenation, autoclaving, or the like.

Depyrogenation is a process wherein pyrogens are removed from a substance. Depyrogenation of glass articles, such as pharmaceutical packages, can be performed by a thermal treatment applied to a sample in which the sample is heated to an elevated temperature for a period of time. For example, depyrogenation may include heating a glass container to a temperature of between about 250° C. and about 380° C. for a time period from about 30 seconds to about 72 hours, including, without limitation, 20 minutes, 30 minutes 40 minutes, 1 hour, 2 hours, 4 hours, 8 hours, 12 hours, 24 hours, 48 hours, and 72 hours. Following the thermal treatment, the glass container is cooled to room temperature. One conventional depyrogenation condition commonly employed in the pharmaceutical industry is thermal treatment at a temperature of about 250° C. for about 30 minutes. However, it is contemplated that the time of thermal treatment may be reduced if higher temperatures are utilized. The coated glass containers, as described herein, may be exposed to elevated temperatures for a period of time. The elevated temperatures and time periods of heating described herein may or may not be sufficient to depyrogenate a glass container. However, it should be understood that some of the temperatures and times of heating described herein are sufficient to dehydrogenate a coated glass container, such as the coated glass containers described herein. For example, as described herein, the coated glass containers may be exposed to temperatures of about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes.

As used herein, lyophilization conditions (i.e., freeze drying) refer to a process in which a sample is filled with a liquid that contains protein and then frozen at −100° C., followed by water sublimation for 20 hours at −15° C. under vacuum.

As used herein, autoclave conditions refer to steam purging a sample for 10 minutes at 100° C., followed by a 20 minute dwelling period wherein the sample is exposed to a 121° C. environment, followed by 30 minutes of heat treatment at 121° C.

The coefficient of friction (u) of the portion of the coated glass container with the lubricous coating may have a lower coefficient of friction than a surface of an uncoated glass container formed from a same glass composition. A coefficient of friction (u) is a quantitative measurement of the friction between two surfaces and is a function of the mechanical and chemical properties of the first and second surfaces, including surface roughness, as well as environmental conditions such as, but not limited to, temperature and humidity. As used herein, a coefficient of friction measurement for a coated glass container 100 is reported as the coefficient of friction between the outer surface of a first glass container (having an outer diameter of between about 16.00 mm and about 17.00 mm) and the outer surface of second glass container which is identical to the first glass container, wherein the first and second glass containers have the same body and the same coating composition (when applied) and have been exposed to the same environments prior to fabrication, during fabrication, and after fabrication. Unless otherwise denoted herein, the coefficient of friction refers to the maximum coefficient of friction measured with a normal load of 30 N measured on a vial-on-vial testing jig, as described herein. However, it should be understood that a coated glass container which exhibits a maximum coefficient of friction at a specific applied load will also exhibit the same or better (i.e., lower) maximum coefficient of friction at a lesser load. For example, if a coated glass container exhibits a maximum coefficient of friction of 0.5 or lower under an applied load of 50 N, the coated glass container will also exhibit a maximum coefficient of friction of 0.5 or lower under an applied load of 25 N.

In the embodiments described herein, the portion of the coated glass container with the lubricous coating has a coefficient of friction of less than or equal to about 0.7 relative to a like-coated glass container, as determined with a vial-on-vial jig. In other embodiments, the coefficient of friction may be less than or equal to about 0.6, or even less than or equal to about 0.5. In some embodiments, the portion of the coated glass container with the lubricous coating has a coefficient of friction of less than or equal to about 0.4 or even less than or equal to about 0.3. Coated glass containers with coefficients of friction less than or equal to about 0.7 generally exhibit improved resistance to frictive damage and, as a result, have improved mechanical properties. For example, conventional glass containers (without a lubricous coating) may have a coefficient of friction of greater than 0.7.

In some embodiments described herein, the coefficient of friction of the portion of the coated glass container with the lubricous coating is at least 20% less than a coefficient of friction of a surface of an uncoated glass container formed from a same glass composition. For example, the coefficient of friction of the portion of the coated glass container with the lubricous coating may be at least 20% less, at least 25% less, at least 30% less, at least 40% less, or even at least 50% less than a coefficient of friction of a surface of an uncoated glass container formed from a same glass composition.

In some embodiments, the portion of the coated glass container with the lubricous coating may have a coefficient of friction of less than or equal to about 0.7 after exposure to a temperature of about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes (i.e., depyrogenation conditions). In other embodiments, the portion of the coated glass container with the lubricous coating may have a coefficient of friction of less than or equal to about 0.7, (i.e., less than or equal to about 0.6, less than or equal to about 0.5, less than or equal to about 0.4, or even less than or equal to about 0.3) after exposure to a temperature of about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes. In some embodiments, the coefficient of friction of the portion of the coated glass container with the lubricous coating may not increase by more than about 30% after exposure to a temperature of about 260° C. for 30 minutes. In other embodiments, coefficient of friction of the portion of the coated glass container with the lubricous coating may not increase by more than about 30% (i.e., about 25%, about 20%, about 15%, or event about 10%) after exposure to a temperature of about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes. In other embodiments, coefficient of friction of the portion of the coated glass container with the lubricous coating may not increase by more than about 0.5 (i.e., about 0.45, about 0.04, about 0.35, about 0.3, about 0.25, about 0.2, about 0.15, about 0.1, or event about 0.5) after exposure to a temperature of about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes. In some embodiments, the coefficient of friction of the portion of the coated glass container with the lubricous coating may not increase at all after exposure to a temperature of about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes.

In some embodiments, the portion of the coated glass container with the lubricous coating may have a coefficient of friction of less than or equal to about 0.7 after being submerged in a water bath at a temperature of about 70° C. for 10 minutes. In other embodiments, the portion of the coated glass container with the lubricous coating may have a coefficient of friction of less than or equal to about 0.7, (i.e., less than or equal to about 0.6, less than or equal to about 0.5, less than or equal to about 0.4, or even less than or equal to about 0.3) after being submerged in a water bath at a temperature of about 70° C. for 5 minutes, 10 minutes, 20 minutes, 30 minutes, 40 minutes, 50 minutes, or even 1 hour. In some embodiments, the coefficient of friction of the portion of the coated glass container with the lubricous coating may not increase by more than about 30% after being submerged in a water bath at a temperature of about 70° C. for 10 minutes. In other embodiments, coefficient of friction of the portion of the coated glass container with the lubricous coating may not increase by more than about 30% (i.e., about 25%, about 20%, about 15%, or event about 10%) after being submerged in a water bath at a temperature of about 70° C. for 5 minutes, 10 minutes, 20 minutes, 30 minutes, 40 minutes, 50 minutes, or even 1 hour. In some embodiments, the coefficient of friction of the portion of the coated glass container with the lubricous coating may not increase at all after being submerged in a water bath at a temperature of about 70° C. for 5 minutes, 10 minutes, 20 minutes, 30 minutes, 40 minutes, 50 minutes, or even 1 hour.

In some embodiments, the portion of the coated glass container with the lubricous coating may have a coefficient of friction of less than or equal to about 0.7 after exposure to lyophilization conditions. In other embodiments, the portion of the coated glass container with the lubricous coating may have a coefficient of friction of less than or equal to about 0.7, (i.e., less than or equal to about 0.6, less than or equal to about 0.5, less than or equal to about 0.4, or even less than or equal to about 0.3) after exposure to lyophilization conditions. In some embodiments, the coefficient of friction of the portion of the coated glass container with the lubricous coating may not increase by more than about 30% after exposure to lyophilization conditions. In other embodiments, coefficient of friction of the portion of the coated glass container with the lubricous coating may not increase by more than about 30% (i.e., about 25%, about 20%, about 15%, or event about 10%) after exposure to lyophilization conditions. In some embodiments, the coefficient of friction of the portion of the coated glass container with the lubricous coating may not increase at all after exposure to lyophilization conditions.

In some embodiments, the portion of the coated glass container with the lubricous coating may have a coefficient of friction of less than or equal to about 0.7 after exposure to autoclave conditions. In other embodiments, the portion of the coated glass container with the lubricous coating may have a coefficient of friction of less than or equal to about 0.7, (i.e., less than or equal to about 0.6, less than or equal to about 0.5, less than or equal to about 0.4, or even less than or equal to about 0.3) after exposure to autoclave conditions. In some embodiments, the coefficient of friction of the portion of the coated glass container with the lubricous coating may not increase by more than about 30% after exposure to autoclave conditions. In other embodiments, coefficient of friction of the portion of the coated glass container with the lubricous coating may not increase by more than about 30% (i.e., about 25%, about 20%, about 15%, or event about 10%) after exposure to autoclave conditions. In some embodiments, the coefficient of friction of the portion of the coated glass container with the lubricous coating may not increase at all after exposure to autoclave conditions.

In the embodiments described herein, the glass container may be coated with inorganic coatings, transient organic coatings, and/or tenacious organic coatings in order to achieve the desired low coefficient of friction and resistance to damage.

Inorganic Coating

In some embodiments described herein, the lubricous coating is an inorganic coating. The inorganic coating may be a tenacious inorganic coating which is permanently adhered to the outer surface of the body of the glass container. The properties of the tenacious inorganic coating are not degraded by exposure to elevated temperatures and, as such, the coefficient of friction and horizontal compression strength of the glass container with the tenacious inorganic coating are substantially the same before and after exposure to elevated temperatures including, without limitation, temperatures in the range from about 260° C. to about 400° C. The tenacious inorganic coating is a continuous coating applied to the outer surface of the body and is generally insoluble in water and/or organic solvents. For example, in some embodiments, the tenacious inorganic coating may comprise a metal nitride coating, a metal sulfide coating, a metal oxide coating, $SiO_2$, diamond-like carbon, or a carbide coating. For example, the tenacious inorganic coating may include at least one of TiN, BN, hBN, $TiO_2$, $Ta_2O_5$, $HfO_2$, $Nb_2O_5V_2O_5$, SnO, $SnO_2$, $ZrO_2$, $Al_2O_3$, $SiO_2$, ZnO, $MoS_2$, BC, SiC, or similar metal oxide, metal nitride and carbide coatings which exhibit a relatively low coefficient of friction relative to a like-coated glass container as well as having relatively high thermal stabilities. In these embodiments, the coatings may be applied to the outer surface of the glass container by physical vapor deposition methods such as evaporation, electron beam evaporation, dc magnetron sputtering, unbalanced dc magnetron sputtering, ac magnetron sputtering, and unbalanced ac magnetron sputtering. Alternatively, the coatings may be applied by powder coating. Chemical vapor deposition (CVD) techniques may also be used to apply the coatings including ultrahigh vacuum CVD, low pressure CVD, atmospheric pressure CVD, metal-organic CVD, laser CVD, photochemical CVD, aerosol assisted CVD, microwave plasma assisted CVD, plasma-enhanced CVD, direct liquid injection CVD, atomic layer CVD, combustion CVD, Hot wire CVD, rapid thermal CVD, chemical vapor infiltration, and chemical beam epitaxy.

In one particular embodiment, the tenacious inorganic coating is diamond-like carbon. Films or coatings formed from diamond-like carbon generally exhibit a low coefficient of friction and high hardness. Specifically, a significant amount of the carbon in DLC coatings is SP3 hybridized carbon. This material imparts some properties of a diamond to these coatings, as high hardness and superior wear resistance. The hardness of the DLC coatings is directly proportional to the content of SP3 hybridized content. The DLC coatings may be deposited on the outer surface of the glass container by ion beam deposition, cathodic arc spray, pulsed laser ablation, argon ion sputtering, and plasma-enhanced chemical vapor deposition. Depending on the thickness of the deposited DLC coating, the specific method of deposition, and the composition of the coating, the color of the deposited layer can vary from optically transparent yellow (i.e., a 0.1 μm thick film of DLC may be optically transparent with a slight yellow cast) to amber and black.

Alternatively, the lubricous coating may be an inorganic coating which is temporarily affixed to the outer surface of the glass container, such as a transient coating. In these embodiments, the transient coating may include an inorganic salt such as $MgSO_4$, $CaSO_4$, $Ca_3(PO_4)_2$, $Mg_3(PO_4)_2$, $KNO_3$, $K_3PO_4$ or the like.

Organic Coatings

In some alternative embodiments, the lubricous coating may be an organic coating, such as a transient coating temporarily affixed to the outer surface of the glass container or a tenacious organic coating which is permanently affixed to the outer surface of the glass container.

With respect to the organic transient coatings, it is desirable to protect the surfaces of glass articles (such as glass container or the like) from damage during manufacture in order to mitigate the reduction in the mechanical strength of the glass due to surface flaws caused by contact with the glass. This is generally achieved by applying a coating having a low coefficient of friction, as described above. However, because the glass container may be subject to further processing, the coating does not need to be permanently adhered to the outer surface of the glass container and, instead, may be removed in downstream processing steps after the coating has served its purpose of protecting the glass article. For example, the transient coating may be removed by pyrolysis. In the embodiments described herein, the transient coating may be pyrolized at temperatures less than or equal to 300° C. in a time period of less than or equal to 1 hour. Alternatively, the transient coating may be pyrolized at temperatures of 265° C. for 2.5 hours or even at 360° C. for 10 minutes or less.

Various organic materials may be utilized to form the transient coating. For example, in some embodiments, the transient coating may comprise, for example, a mixture of polyoxyethylene glycol, methacrylate resin, melamine formaldehyde resin, and polyvinyl alcohol as disclosed in U.S.

Pat. No. 3,577,256. Such a coating may be applied to the outer surface of the glass container after formation and may be pyrolized from the glass surface in the annealing lehr.

In another embodiment, the transient organic coating may comprise one or more polysaccharides, as disclosed in U.S. Pat. No. 6,715,316B2 which describes removable protective coatings. Such coatings can be removed from the glass surface using a mild, water-based detergent, such as, for example 2% Semiclean KG in water.

In another embodiment, the transient organic coating may be a "cold-end" coating as described in U.S. Pat. No. 4,055,441 or similar coatings. Such coatings may be formed from at least one of poly(ethylene oxides), poly (propylene oxides), ethylene oxide-propylene oxide copolymers, poly-vinyl-pyrrolidinones, polyethyleneimines, poly(methyl vinyl ethers), polyacrylamides, polymethacrylamides, poly-urethanes, poly(vinylacetates), polyvinyl formal, polyform-aldehydes including polyacetals and acetal copolymers, poly (alkyl methacrylates), methyl celluloses, ethyl celluloses, hydroxyethyl celluloses, hydroxypropyl celluloses, sodium carboxymethyl celluloses, methyl hydroxypropyl celluloses, poly (acrylic acids) and salts thereof, poly(methacrylic acids) and salts thereof, ethylene-maleic anhydride copoly-mers, ethylene-vinyl alcohol copolymers, ethylene-acrylic acid copolymers, vinyl acetate-vinyl alcohol copolymers, methyl vinyl ether-maleic anhydride copolymers, emulsifi-able polyurethanes, polyoxyethylene stearates, and polyole-fins including polyethylenes, polypropylenes and copoly-mers thereof, starches and modified starches, hydrocolloids, polyacrylamide, vegetable and animal fats, wax, tallow, soap, stearine-paraffin emulsions, polysiloxanes of dimethyl or diphenyl or methyl/phenyl mixtures, perfluorinated siloxanes and other substituted siloxanes, alkylsilanes, aro-matic silanes, and oxidized polyethylene.

The transient organic coatings may be applied by con-tacting such a coating directly with the glass container. For example, the coating may be applied by a submersion process, or alternatively, by a spray or other suitable means. The coating may then be dried, and, optionally, cured at high temperatures.

Tenacious Organic Coatings

In some embodiments, the lubricous coating is a tenacious organic coating adhered to at least a portion of the outer surface of the glass body. The tenacious organic coating has a low coefficient of friction and is also thermally stable at elevated temperatures, as described above. The lubricous coating has an outer surface and a glass contacting surface. In embodiments where the lubricous coating is a tenacious organic coating, the lubricous coating may comprise a coupling agent layer that is in direct contact with the outer surface of the glass body and a polymer layer that is in direct contact with the coupling agent layer. However, it should be understood that, in some embodiments, the lubricous coat-ing may not include a coupling agent layer and the polymer layer may be in direct contact with the outer surface of the glass body.

The lubricous coating applied to the outer surface of the glass body may have a thickness of less than about 100 μm or even less than or equal to about 1 μm. In some embodi-ments, the thickness of the lubricous coating may be less than or equal to about 100 nm thick. In other embodiments, the lubricous coating may be less than about 90 nm thick, less than about 80 nm thick, less than about 70 nm thick, less than about 60 nm thick, less than about 50 nm, or even less than about 25 nm thick. In some embodiments, the lubricous coating may not be of uniform thickness over the entirety of the glass body. For example, the coated glass container may have a thicker lubricous coating in some areas, due to the process of contacting the outer surface of the glass body with one or more coating solutions that form the lubricous coating. In some embodiments, the lubricous coating may have a non-uniform thickness. For example, the coating thickness may be varied over different regions of a coated glass container, which may promote protection in a selected region. In another embodiment, only selected portions of the outer surface of the glass body are coated with a lubricous coating.

It should now be understood that the glass containers described herein may have at least two performance attri-butes selected from resistance to delamination, improved strength, and increased damage resistance. For example, the glass containers may have a combination of resistance to delamination and improved strength; improved strength and increased damage resistance; or resistance to delamination and increased damage resistance.

For example, in one embodiment a glass container may include a body having an inner surface, an outer surface and a wall thickness extending between the outer surface and the inner surface. The body may have a delamination factor less than or equal to 10. The body may also have a compressively stressed layer extending from the outer surface of the body into the wall thickness. The compressively stressed layer may have a surface compressive stress greater than or equal to 150 MPa.

In another embodiment, the glass container may include a body having an inner surface, an outer surface and a wall thickness extending between the outer surface and the inner surface. In this embodiment, the body may be formed from a Type IB glass composition. The body may also have a compressively stressed layer extending from the outer sur-face of the body into the wall thickness. The compressively stressed layer may have a surface compressive stress greater than or equal to 150 MPa. A barrier coating may be positioned on the inner surface of the body such that a composition contained in the glass container contacts the barrier coating and not the inner surface of the body thereby preventing delamination.

Alternatively, the glass container may include a body having an inner surface, an outer surface and a wall thick-ness extending from the outer surface to the inner surface. The body may be formed from a glass composition which is substantially free from boron and compounds containing boron. The body may also have a compressively stressed layer which extends from the outer surface of the body into the wall thickness. The compressively stressed layer may have a surface compressive stress greater than or equal to 150 MPa.

In still another embodiment, the glass container may include a body having an inner surface, an outer surface and a wall thickness extending between the outer surface and the inner surface. The body may be formed from a Type IB glass composition under processing conditions which mitigate the vaporization of volatile species in the glass composition. The body may also include a compressively stressed layer extending from the outer surface of the body into the wall thickness. The compressively stressed layer having a surface compressive stress greater than or equal to 150 MPa.

In still another embodiment, the glass container may include a body having an inner surface, an outer surface and a wall thickness extending between the outer surface and the inner surface. The body may be a mold-formed body com-prising a Type IB glass composition. The body may also include a compressively stressed layer extending from the outer surface of the body into the wall thickness. The compressively stressed layer having a surface compressive stress greater than or equal to 150 MPa.

In still another embodiment, the glass container may include a body having an inner surface, an outer surface and a wall thickness extending between the outer surface and the inner surface. The body may have a compressively stressed layer extending from the outer surface of the body into the wall thickness. The compressively stressed layer may have a surface compressive stress greater than or equal to 150 MPa. A lubricous coating may be positioned on at least a portion of the outer surface of the body. The outer surface of the body with the lubricous coating may have a coefficient of friction less than or equal to 0.7.

In yet another embodiment, the glass container may include a body having an inner surface, an outer surface and a wall thickness extending between the outer surface and the inner surface. The body may be formed from a Type IB glass composition. A compressively stressed layer may extend from the outer surface of the body into the wall thickness, the compressively stressed layer having a surface compressive stress greater than or equal to 150 MPa. A lubricous coating may be positioned on at least a portion of the outer surface of the body, wherein the outer surface of the body with the lubricous coating has a coefficient of friction less than or equal to 0.7.

In some other embodiments, the glass container may include a body having an inner surface, an outer surface and a wall thickness extending from the outer surface to the inner surface, wherein the body is formed from a glass composition which is substantially free from boron and compounds containing boron. A compressively stressed layer may extend from the outer surface of the body into the wall thickness, the compressively stressed layer having a surface compressive stress greater than or equal to 150 MPa. A lubricous coating may be positioned on at least a portion of the outer surface of the body. The outer surface of the body with the lubricous coating may have a coefficient of friction less than or equal to 0.7.

In still other embodiments, the glass container may include a body having an inner surface, an outer surface and a wall thickness extending between the outer surface and the inner surface. At least the inner surface of the body may have a delamination factor of less than or equal to 10. A tenacious inorganic coating may be positioned on at least a portion of the outer surface of the body. The outer surface of the body with the tenacious inorganic coating has a coefficient of friction less than or equal to 0.7.

Alternatively, a glass container may include a body having an inner surface, an outer surface and a wall thickness extending between the outer surface and the inner surface. At least the inner surface of the body may have a delamination factor less than or equal to 10. A transient coating may be positioned on at least a portion of the outer surface of the body. The transient coating may pyrolyze at temperatures less than or equal to 300° C. in less than or equal to 1 hour. The outer surface of the body with the transient coating may have a coefficient of friction less than or equal to 0.7.

In still other embodiments, the glass container may include a body having an inner surface, an outer surface and a wall thickness extending between the outer surface and the inner surface. At least the inner surface of the body may have a delamination factor less than or equal to 10. A tenacious organic coating may be positioned on at least a portion of the outer surface of the body. The outer surface of the body with the tenacious organic coating may have a coefficient of friction less than or equal to 0.7.

In some other embodiments, a glass container includes a body having an inner surface, an outer surface and a wall thickness extending between the outer surface and the inner surface. The glass body may be formed from a Type IB glass composition. A barrier coating may be positioned on the inner surface of the body such that a composition contained in the glass container does not contact the inner surface of the body. A lubricous coating may be positioned on at least a portion of the outer surface of the body. The outer surface of the body with the lubricous coating may have a coefficient of friction less than or equal to 0.7.

Alternatively, a glass container may include a body having an inner surface, an outer surface and a wall thickness extending from the outer surface to the inner surface. The body may be formed from a glass composition which is substantially free from boron and compounds containing boron. A lubricous coating may be positioned on at least a portion of the outer surface of the body, wherein the outer surface of the body with the lubricous coating has a coefficient of friction less than or equal to 0.7.

In some other embodiments, a glass container may include a body having an inner surface, an outer surface and a wall thickness extending between the outer surface and the inner surface. The body may be formed from a Type IB glass composition under processing conditions which mitigate the vaporization of volatile species in the glass composition. A lubricous coating may be positioned on at least a portion of the outer surface of the body, wherein the outer surface of the body with the lubricous coating has a coefficient of friction less than or equal to 0.7.

In some other embodiments, a glass container may include a body having an inner surface, an outer surface and a wall thickness extending between the outer surface and the inner surface. The body may be a body comprising a Type IB glass composition. A lubricous coating may be positioned on at least a portion of the outer surface of the body, wherein the outer surface of the body with the lubricous coating has a coefficient of friction less than or equal to 0.7.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A particle detection system for detecting particles generated from collisions of glass articles, comprising:

a light source configured to emit a light beam, the light beam being formed into a light sheet and being directed to an area below the glass articles; and a camera configured to capture an image of an inspection area within the light sheet, the inspection area being below the glass articles.

2. The particle detection system of claim 1, further comprising an optics system configured to shape the light beam into the light sheet, the optics system being disposed in an optical path of the light beam between the light source and the inspection area.

3. The particle detection system of claim 1, further comprising a mirror to reflect an image of the inspection area toward the camera.

4. The particle detection system of claim 1, wherein the light source is a laser light source.

5. The particle detection system of claim 1, further comprising a holder for holding the glass articles.

6. The particle detection system of claim 5, wherein the holder comprises a support surface configured to support the glass articles thereon, and wherein the support surface has an open or porous structure configured to allow particles generated by the glass articles to fall through the support surface to the inspection area.

7. The particle detection system of claim 6, wherein the inspection area is disposed below the support surface and in a position to which particles generated by the glass articles can fall.

8. The particle detection system of claim 5, further comprising an actuator coupled to the holder and configured to move the glass articles.

9. The particle detection system of claim 8, wherein the actuator is an acceleration table configured to move the glass articles in a way that causes the glass articles to collide with one another.

10. The particle detection system of claim 1, further comprising a computing device communicatively coupled to the camera, the computing device comprising at least one processor and at least one memory storing computer readable and executable instructions that, when executed by the at least one processor, cause the computer device to determine whether a particle is present within the inspection area.

11. The particle detection system of claim 10, wherein the computer readable and executable instructions, when executed by the processor, cause the computing device to record a time at which the particle is detected within the inspection area.

12. The particle detection system of claim 11, wherein the computer readable and executable instructions, when executed by the processor, cause the computing device to process the image from the camera to convert the image into a binary mask.

13. The particle detection system of claim 10, wherein the computer readable and executable instructions, when executed by the processor, cause the computing device to perform an image processing task on the image received from the camera, the image processing task being selected from the group consisting of: edge enhancement, contrast enhancement, particle enlargement, brightness adjustment, threshold filtering, particle filtering, or noise reduction.

14. The particle detection system of claim 10, wherein the computer readable and executable instructions, when executed by the processor, cause the computing device to record an association of the detection of a particle with one or more glass articles above the inspection area at or near the time of detection.

15. The particle detection system of claim 10, wherein the computer readable and executable instructions, when executed by the processor, cause the computing device to determine a rate of particle generation.

16. The particle detection system of claim 1, wherein the camera is configured to image the inspection area at a frame rate of about 100 Hz.

17. The particle detection system of claim 1, wherein the camera is configured to image the inspection area with an exposure time of about 10 ms or less.

18. A method of detecting particles generated from a glass article collision, the method comprising:

directing a light beam to an area below one or more glass articles;

capturing, by a camera, an image of an inspection area within the light beam beneath the one or more glass articles; and determining whether a particle is present in the image.

19. The method of claim 18, further comprising forming the light beam into a light sheet such that the inspection area is within the light sheet.

20. The method of claim 18, further comprising accelerating the one or more glass articles to create the glass article collision, wherein the inspection area is imaged by the camera while accelerating the one or more glass articles.

*     *     *     *     *